(12) United States Patent
Matsumura et al.

(10) Patent No.: US 11,394,445 B2
(45) Date of Patent: Jul. 19, 2022

(54) USER TERMINAL

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/259,404

(22) PCT Filed: Jul. 12, 2018

(86) PCT No.: PCT/JP2018/026392
§ 371 (c)(1),
(2) Date: Jan. 11, 2021

(87) PCT Pub. No.: WO2020/012618
PCT Pub. Date: Jan. 16, 2020

(65) Prior Publication Data
US 2021/0126690 A1    Apr. 29, 2021

(51) Int. Cl.
*H04B 7/02* (2018.01)
*H04B 7/06* (2006.01)
*H04B 17/382* (2015.01)

(52) U.S. Cl.
CPC ......... *H04B 7/0632* (2013.01); *H04B 7/0641* (2013.01); *H04B 7/0654* (2013.01); *H04B 17/382* (2015.01)

(58) Field of Classification Search
CPC .. H04B 7/0632; H04B 17/382; H04B 7/0641; H04B 7/0654; H04B 7/0695; H04L 5/0035; H04L 5/0048; H04L 5/0023

USPC ......................................................... 375/267
See application file for complete search history.

(56) References Cited

U.S. PATENT DOCUMENTS

| | | | | |
|---|---|---|---|---|
| 11,013,034 B2 * | 5/2021 | Kwon | ............... | H04W 74/0833 |
| 2019/0081675 A1 * | 3/2019 | Jung | .................. | H04W 56/001 |
| 2019/0090143 A1 * | 3/2019 | Luo | ..................... | H04B 7/0617 |
| 2019/0141691 A1 * | 5/2019 | Kwon | ................. | H04W 72/046 |
| 2019/0150010 A1 * | 5/2019 | Kwon | .................. | H04W 24/10 370/252 |

(Continued)

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

(Continued)

*Primary Examiner* — Don N Vo
(74) *Attorney, Agent, or Firm* — Osha Bergman Watanabe & Burton LLP

(57) ABSTRACT

For proper beam failure detection or beam failure recovery even when a plurality of transmission points are used, an aspect of user equipment of the present disclosure includes: a receiving section configured to receive information regarding a number or proportion of at least one of a beam, a link, and a reference signal used to specify partial beam failure detection with respect to one or more transmission/reception points; and a control section configured to perform partial beam failure detection at one or a plurality of transmission/reception points based on the information.

10 Claims, 16 Drawing Sheets

(56) References Cited

U.S. PATENT DOCUMENTS

2021/0204182 A1* 7/2021 Muller ............ H04W 36/00837

OTHER PUBLICATIONS

3GPP TSG RAN WG1 Meeting NR#3; R1-1716690 "On beam recovery for partial and full control channel failure" AT&T; Nagoya, Japan; Sep. 18-21, 2017 (7 pages).
3GPP TSG RAN WG1 Meeting #92; R1-1801454 "Remaining issues on beam failure recovery" Huawei, HiSilicon; Athens, Greece; Feb. 26-Mar. 2, 2018 (9 pages).
3GPP TSG RAN WG1 Meeting #92; R1-1802824 "Beam recovery procedures" Qualcomm Incorporated; Athens, Greece; Feb. 26-Mar. 2, 2018 (11 pages).
International Search Report issued in International Application No. PCT/JP2018/026392, dated Oct. 9, 2018 (4 pages).
Written Opinion issued in International Application No. PCT/JP2018/026392; dated Oct. 9, 2018 (3 pages).
Extended European Search Report issued in counterpart European Patent Application No. 18926232.2, dated Feb. 2, 2022 (7 pages).
AT&T; "In support of partial beam failure"; 3GPP TSG RAN WG1 Meeting #92, R1-1802593; Athens, Greece; Feb. 26-Mar. 2, 2018 (3 pages).
Huawei, HiSilicon; "Beam Failure Recovery Design Details"; 3GPP TSG RAN WG1 Meeting AH NR#3, R1-1715468; Nagoya, Japan; Sep. 18-21, 2017 (10 pages).

* cited by examiner

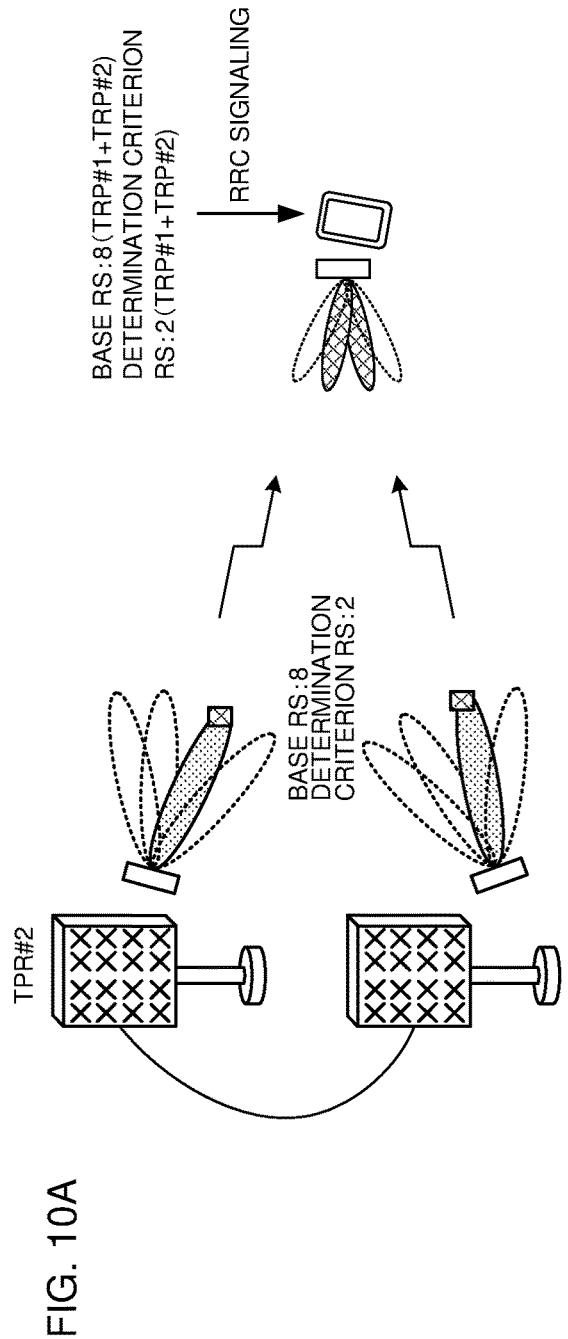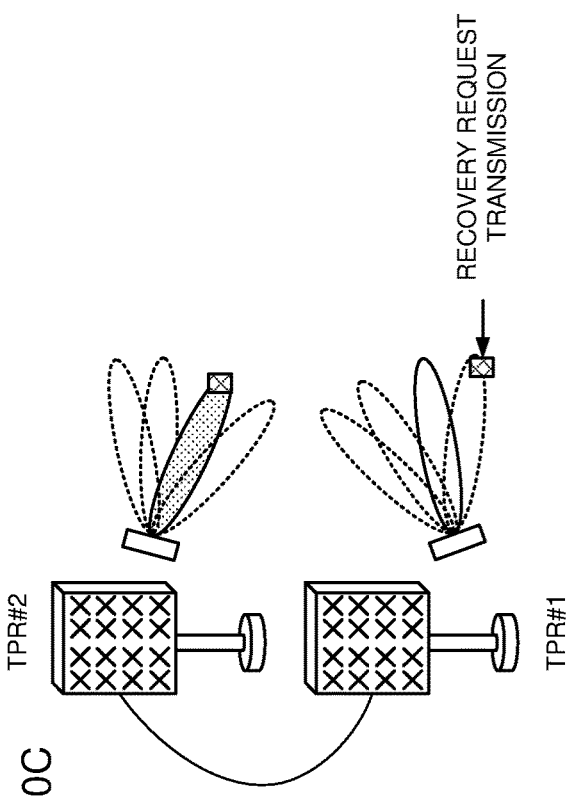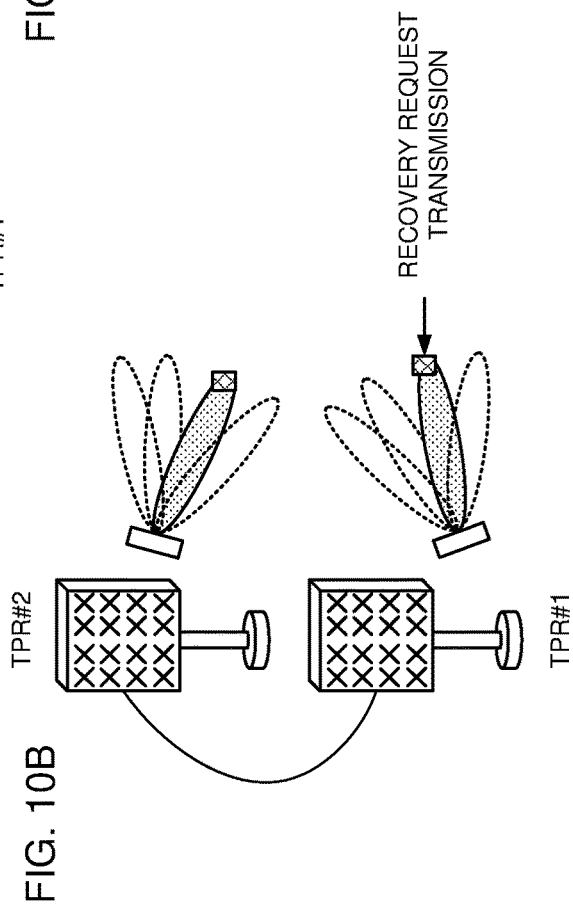

USER TERMINAL

TECHNICAL FIELD

The present disclosure relates to user equipment in a next-generation mobile communication system.

BACKGROUND ART

In the UMTS (Universal Mobile Telecommunications System) network, the specifications of long-term evolution (LTE) have been drafted for the purpose of further increasing high speed data rates, providing lower delays and so on (see Non-Patent Literature 1). In addition, the specifications of LTE-A (LTE Advanced, LTE Rel. 10-14) have been drafted for the purpose of further increasing the capacity and sophistication of LTE (LTE Rel. 8, 9).

Successor systems of LTE are also under study (also referred to as, for example, "FRA (Future Radio Access)", "5G (5th generation mobile communication system)", "5G+ (plus)", "NR (New Radio)", "NX (New radio access)", "FX (Future generation radio access)", "LTE Rel. 14" "LTE Rel. 15 or later versions" and so on).

In the existing LTE system (LTE Rel. 8 to 14), monitoring of radio link quality (radio link monitoring (RLM)) is performed. When a radio link failure (RLF) is detected by the RLM, a re-establishment of RRC (Radio Resource Control) connection is demanded for user terminal (UE: user equipment).

CITATION LIST

Non-Patent Literature

Non-Patent Literature 1:3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In future radio communication systems (for example, NR), it is considered to perform a procedure to detect a beam failure and switch to another beam (which may also be referred to as "beam failure recovery (BFR) procedure", "BFR" and so on).

In Rel-15 NR, BFR is triggered when all the qualities of the reference signal for beam failure detection fall below a given threshold value. On the other hand, when the quality of a part of the reference signal for beam failure detection becomes less than a given threshold value, it is determined to be partial beam failure and it is considered that beam failure recovery is performed.

Further, in NR, it is also assumed that communication is performed using multiple transmission/reception points (TRPs). In this case, it is conceivable to perform beam failure detection in a plurality of TRPs, but how to control beam failure detection or beam failure recovery in each TRP becomes a problem. If beam failure detection or beam failure recovery in each TRP cannot be properly controlled, communication throughput may decrease or communication quality may deteriorate.

The present disclosure has been made in view of such a point, and an object of the present disclosure is to provide user equipment capable of appropriately performing beam failure detection or beam failure recovery even when a plurality of transmission points are used.

Solution to Problem

User equipment according to an aspect of the present disclosure includes: a receiving section configured to receive information regarding a number or proportion of at least one of a beam, a link, and a reference signal used to specify partial beam failure detection with respect to one or more transmission/reception points; and a control section configured to perform partial beam failure detection at one or a plurality of transmission/reception points based on the information.

Advantageous Effects of Invention

According to one aspect of the present disclosure, beam failure detection or beam failure recovery can be appropriately performed even when a plurality of transmission points are used.

BRIEF DESCRIPTION OF DRAWINGS

FIGS. 10A to 10C are diagrams showing another example of transmission of a recovery request for partial beam failure detection.

DESCRIPTION OF EMBODIMENTS

In NR, communication using beam forming has been under study. For example, an UE and a base station (for example, gNB (gNodeB)) may use a beam used for signal transmission (also referred to as "transmission beam", "Tx beam" and so on) or a beam used for signal reception (also referred to as "reception beam", "Rx beam" and so on).

When beam forming is used, it is susceptible to disturbance by an obstacle, and hence it is assumed that the radio link quality will be deteriorated. Radio link failure (RLF) may frequently occur due to deterioration of the radio link quality. When the RLF occurs, cell reconnection is necessary, and hence frequent occurrence of the RLF causes deterioration of system throughput.

In NR, in order to suppress occurrence of the RLF, when the quality of a specific beam deteriorates, it is considered to perform a procedure of switching to another beam (which may also be referred to as "beam recovery (BR)", "beam failure recovery (BFR)", "L1/L2 (Layer 1/Layer 2) beam recovery" and so on). Note that the BFR procedure may also be simply referred to as "BFR".

Note that the beam failure in the present disclosure may be referred to as a link failure.

Figure 1:
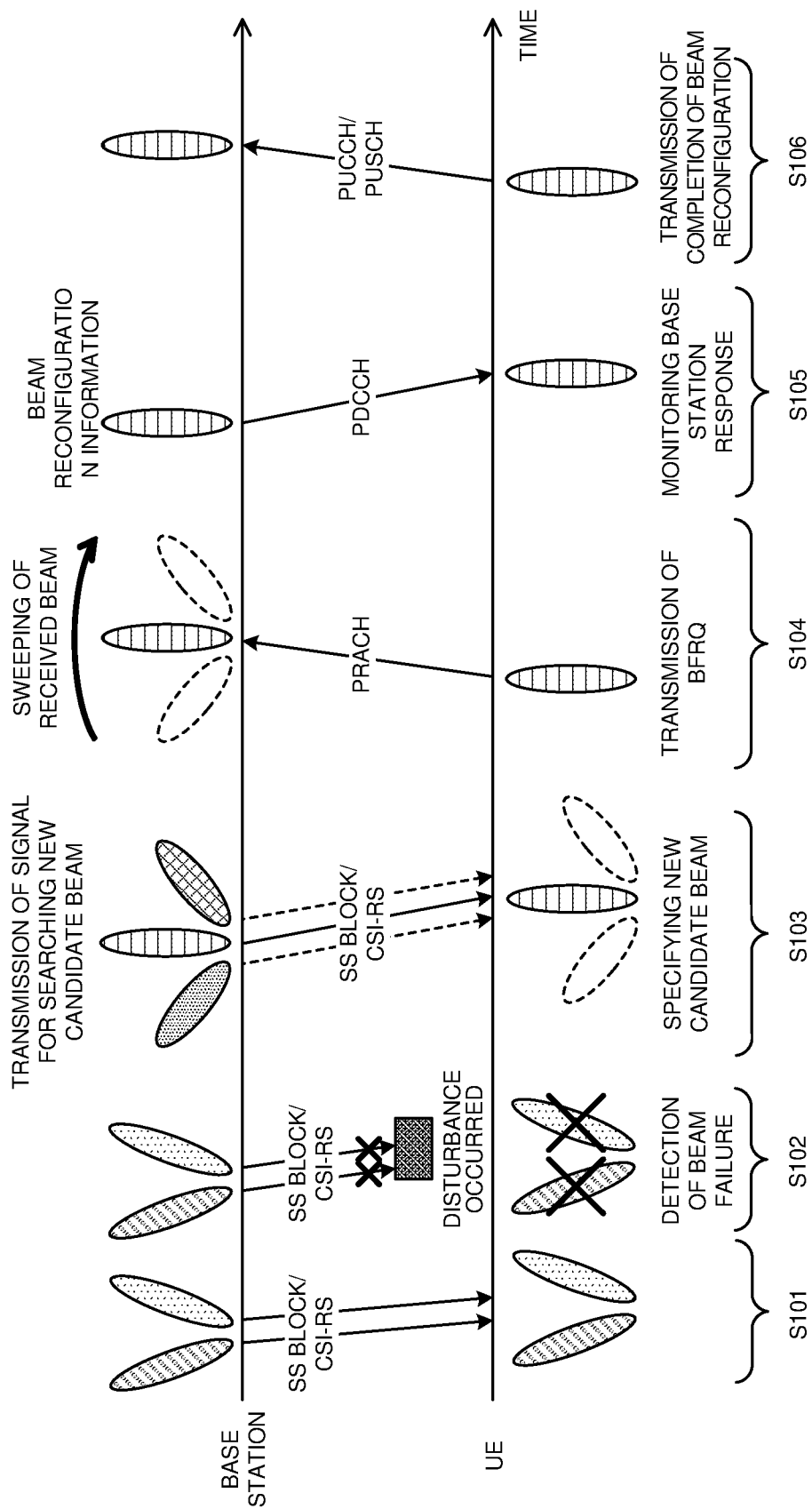
FIG. 1 is a diagram showing an example of a beam recovery procedure in Rel-15 NR.

FIG. 1 is a diagram showing an example of a beam recovery procedure in Rel-15 NR. The number of beams and so on are examples, and the number is not limited to this. In an initial state (step S101) of FIG. 1, the UE performs measurement based on a reference signal (RS) resource transmitted using two beams.

The RS may be at least one of a synchronization signal block (SSB) and a channel state information RS (CSI-RS). Note that the SSB may also be referred to as a "SS/PBCH (Physical Broadcast Channel) block" and so on.

The RS may be at least one of a primary synchronization signal (PSS (Primary SS)), a secondary synchronization signal (SSS (Secondary SS)), a mobility reference signal (MRS (Mobility RS)), a signal included in the SSB, CSI-RS, a demodulation reference signal (DMRS), a beam-specific signal and so on, or a signal configured by expanding, modifying these. The RS measured in step S101 may be referred to as RS for beam failure detection (BFD-RS).

In step S102, the radio wave from the base station is disturbed, so that the UE cannot detect the BFD-RS (or the received quality of the RS is deteriorated). Such disturbance may occur due to the influences of obstacles, fading, interference and so on between the UE and the base station, for example.

The UE detects a beam failure when a given condition is satisfied. The UE may detect the occurrence of beam failure, for example, when the BLER (Block Error Rate) is less than the threshold value for all the configured BFD-RS (BFD-RS resource configuration). When the occurrence of a beam failure is detected, the lower layer (physical (PHY) layer) of the UE may report (instruct) the beam failure instance to the higher layer (MAC layer).

Note that the criterion for determination is not limited to BLER, and may be reference signal received power in the physical layer (L1-RSRP). Further, instead of the RS measurement or in addition to the RS measurement, beam failure detection may be performed based on a downlink control channel (PDCCH (Physical Downlink Control Channel)) and so on. The BFD-RS may be expected to be a quasi-co-location (QCL) with the DMRS of the PDCCH monitored by the UE.

Here, QCL is an index indicating the statistical properties of the channel. For example, when one signal/channel has a QCL relationship with another signal/channel, between these different signals/channels, it may mean that it is possible to assume that they are the same at least in one of doppler shift, doppler spread, average delay, delay spread, spatial parameter (e.g., spatial Rx parameter) (i.e., QCL for at least one of these).

Note that the spatial Rx parameter may correspond to the reception beam of the UE (for example, reception analog beam), and the beam may be specified based on the spatial QCL. The QCL (or at least one element of the QCL) in the present disclosure may be read as sQCL (spatial QCL).

Information regarding the BFD-RS (for example, an RS index, resource, the number, the number of ports, precoding, etc.), information regarding the beam failure detection (BFD) (for example, the above-mentioned threshold value) and so on may be configured in (reported to) the UE using higher layer signaling and so on. The information regarding the BFD-RS may be referred to as information regarding resources for BFR.

In the present disclosure, the higher layer signaling may be, for example, any of RRC (Radio Resource Control) signaling, MAC (Medium Access Control) signaling, broadcast information and so on, or a combination thereof.

For the MAC signaling, for example, a MAC control element (MAC CE), a MAC protocol data unit (PDU), or the like may be used. The broadcast information may be, for example, a master information block (MIB), a system information block (SIB), a minimum system information (Remaining Minimum System Information (RMSI)), other system information (OSI), or the like.

A MAC layer of the UE may start a given timer (which may also be referred to as "beam failure detection timer") when a beam failure instance report is received from a PHY layer of the UE. The MAC layer of the UE may trigger the BFR (for example, start any of random access procedures described later) when the beam failure instance report is received a certain number of times or more (for example, beamFailureInstanceMaxCount configured by the RRC) before the timer expires.

The base station may determine that the UE has detected a beam failure when there is no report from the UE or when a given signal (beam recovery request in step S104) is received from the UE.

In step S103, the UE starts a search for a new candidate beam to be newly used for communication for beam recovery. The UE may select a new candidate beam corresponding to the RS by measuring a given RS. The RS measured in step S103 may be referred to as RS for new candidate beam identification (NCBI-RS), CBI-RS, CB-RS (Candidate Beam RS), or the like. The NCBI-RS may be the same as or different from the BFD-RS. Note that the new candidate beam may be simply referred to as a candidate beam.

The UE may determine a beam corresponding to an RS that satisfies a given condition as a new candidate beam. The UE may, for example, determine a new candidate beam based on the RS of which L1-RSRP exceeds the threshold value among the configured NCBI-RSs. Note that the criterion of determination is not limited to the L1-RSRP. The L1-RSRP for SSB may be referred to as SS-RSRP. The L1-RSRP for CSI-RS may be referred to as CSI-RSRP.

Information regarding the NCBI-RS (for example, an RS resource, the number, the number of ports, precoding, etc.), information regarding the new candidate beam identification (NCBI) (for example, the above-mentioned threshold value) and so on may be configured in (reported to) the UE using higher layer signaling and so on. The information regarding the NCBI-RS may be obtained based on the information regarding the BFD-RS. The information regarding the NCBI-RS may be referred to as information regarding resources for NBCI.

Note that BFD-RS, NCBI-RS, etc. may be read as a radio link monitoring reference signal (RLM-RS).

In step S104, the UE that has specified the new candidate beam transmits a beam failure recovery request (BFRQ). The beam recovery request may also be referred to as a "beam recovery request signal", a "beam failure recovery request signal" and so on.

The BFRQ may be transmitted using, for example, at least one of an uplink control channel (PUCCH (Physical Uplink Control Channel)), a random access channel (PRACH (Physical Random Access Channel)), an uplink shared channel (PUSCH (Physical Uplink Shared Channel)), and a configured grant PUSCH.

The BFRQ may include information regarding the new candidate beam specified in step S103. The resource for the BFRQ may be associated with the new candidate beam. Beam information may be reported using a beam index (BI), a port index of a given reference signal, a resource index (for example, CSI-RS resource indicator (CRI), an SSB resource indicator (SSBRI)) and so on.

In Rel-15 NR, CB-BFR (Contention-Based BFR) which is a BFR based on a contention based random access (RA (Random Access)) procedure and CF-BFR (Contention-Free BFR) which is a BFR based on a non-contention based random access procedure have been under study. In CB-BFR and CF-BFR, the UE may transmit a preamble (which is also referred to as a "RA preamble", a "random access channel (PRACH (Physical Random Access Channel))", a "RACH preamble" and so on) as a BFRQ using a PRACH resource.

In CB-BFR, the UE may transmit a preamble randomly selected from one or more preambles. On the other hand, in CF-BFR, the UE may transmit a preamble uniquely allocated from the base station to the UE. In CB-BFR, the base station may allocate the same preamble to a plurality of UEs. In CF-BFR, the base station may allocate preambles individually to the UEs.

Note that CB-BFR and CF-BFR may also be referred to as "CB PRACH-based BFR (CBRA-BFR (contention-based PRACH-based BFR))" and "CF PRACH-based BFR (CFRA-BFR (contention-free PRACH-based BFR)), respectively. CBRA-BFR may also be referred to as "CBRA for BFR". CFRA-BFR may also be referred to as "CFRA for BFR".

In either CB-BFR or CF-BFR, the information regarding the PRACH resource (RA preamble) may be reported by, for example, higher layer signaling (RRC signaling and so on). For example, the information may include information indicating a correspondence relationship between the detected DL-RS (beam) and the PRACH resource, and different PRACH resources may be associated with each DL-RS.

In step S105, the base station that has detected the BFRQ transmits a response signal to the BFRQ (which may also be referred to as a "gNB response" or the like) from the UE. The response signal may include reconfiguration information for one or more beams (for example, DL-RS resource configuration information).

The response signal may be transmitted in an UE common search space of PDCCH, for example. The response signal may be reported using PDCCH (DCI) scrambled in cyclic redundancy check (CRC) by an identifier of the UE (for example, cell-radio RNTI (C-RNTI)). The UE may determine at least one of transmission beam and reception beam to be used based on beam reconfiguration information.

The UE may monitor the response signal based on at least one of the control resource set (CORESET: COntrol REsource SET) for BFR and the search space set for BFR.

For CB-BFR, contention resolution may be determined to be successful when the UE receives a PDCCH corresponding to the C-RNTI for itself.

Regarding the processing of step S105, a period for the UE to monitor a response from the base station (for example, gNB) to the BFRQ may be configured. The period may also be referred to as, for example, a "gNB response window", a "gNB window", a "beam recovery request response window" and so on. The UE may retransmit the BFRQ if there is no gNB response detected within the window period.

In step S106, the UE may transmit a message indicating that the beam reconfiguration is completed to the base station. The message may be transmitted by PUCCH or PUSCH, for example.

The beam recovery success (BR success) may represent a case where the processing reaches step S106, for example. Meanwhile, the beam recovery failure (BR failure) may correspond to, for example, that the BFRQ transmission has reached a given number of times or that the beam failure recovery timer (Beam-failure-recovery-Timer) has expired.

Note that the numbers of these steps are merely numbers for description, and a plurality of steps may be combined or the order may be changed. Further, whether or not to implement BFR may be configured in the UE by using higher layer signaling.

By the way, as described above, in Rel-15 NR, beam recovery is triggered when the quality of all BFD-RSs falls below a given threshold value (all beams have failure). When all beams have failure, it is assumed that there is no UL beam (UL link) available for the UE, and therefore the BFR under consideration so far uses a PRACH to transmit a BFRQ.

However, for PRACH-based BFR, it is necessary to secure PRACH resources in advance. Therefore, when the number of beams is large, there is a problem that resources are wasted (the number of resources that cannot be used for data transmission/reception increases). In addition, since the PRACH-based BFR follows a random access procedure, there is also a problem that there is a delay in beam recovery. As a result, the communication throughput may decrease.

Therefore, the present inventors have focused on the fact that partial beam failure is determined to be detected (or radio link failure is determined to be detected) when the quality of some of the BFD-RSs is less than the given threshold value, not when the quality of all the BFD-RSs is less than the given threshold value and beam failure recovery is performed, and it can be performed via an available beam or link. As a result, the uplink control channel or the uplink shared channel can be used, and resource waste can be suppressed and the BFR can be performed at high speed.

On the other hand, in NR, it is assumed that communication is performed using multiple transmission/reception points (TRPs). In this case, it is conceivable to perform partial beam failure detection in a plurality of TRPs, but how to control the partial beam failure detection in each TRP or the beam failure recovery based on the partial beam failure detection is a problem.

Therefore, the present inventors have conceived of a method of appropriately controlling partial beam failure detection or beam failure recovery based on the partial beam failure detection when one or more TRPs are used.

Hereinafter, embodiments according to the present disclosure will be described in detail with reference to the drawings. The respective aspects may be applied individually or in combination. Further, in the following description, the transmission/reception point (TRP) may be replaced with any of a panel, a cell, a carrier, a component carrier (CC), or a base station. In the following description, it is assumed that each transmission/reception point is connected by a non-ideal backhaul link, but this is not limited thereto, and the transmission/reception point may be connected by an ideal backhaul link.

(First Aspect)

The first aspect describes the configuration of partial beam failure detection when communicating using one or more TRPs. The partial beam failure detection may be referred to as partial beam failure detection, partial link failure detection, partial beam link failure detection, and the like.

The base station configures, in the UE, a given number of reference signals (hereinafter also referred to as RS or BFD-RS) as reference signal resources (e.g., Beam-Failure-Detection-RS-ResourceConfig) used for beam failure detection with respect to each TRP. The UE measures the radio link quality of the RS (or RS resource) configured from the base station for each TRP. The radio link quality may be determined by received power, RSRP, RSRP, or RSSI.

For example, the UE determines that beam failure is detected when the radio link quality of the resource configuration of all RSs is worse than a given threshold value threshold value $Q_{OUT,LR}$ (for example, less than the given threshold value) among the configured RSs. The radio link quality may be determined by at least one of BLER, RSRP (Reference Signal Received Power), RSRQ (Reference Signal Received Quality), SINR (Signal to Interference plus Noise Ratio) and the like.

Note that the name indicating the radio link quality may be expressed with the word "L1-". For example, RSRP, RSRQ, and SINR may be referred to as L1-RSRP, L1-RSRQ, L1-SINR, and the like, respectively.

On the other hand, the UE may determine that partial beam failure is detected when the radio link quality of some RSs (or resource configuration of some RSs) among the configured RSs is less than a given value (or equal to or less than a given value). Note that some RSs among the configured RSs refer to a certain proportion or a certain number of RSs among the configured RSs.

When one or more TRPs are used, information (for example, the number or proportion of RSs) regarding RSs for determining (specifying) partial beam failure detection can be configured for each TRP or across a plurality of TRPs. One of the following options 1-1 to 1-4 can be applied as a configuration of the number of RSs used for determining the partial beam failure detection (for example, the number of determination criterion RSs). In the following description, the number of RSs may be read as the proportion of RSs. Also, the RS, the beam, or the link may be read interchangeably. For example, the RS may be read as the beam.

Note that, in the following description (each option), an example is given of the case where the number of RSs (or RS resources) as the base for beam failure detection is four for each TRP, but the number of RSs that can be configured is not limited to this. Different values may be configured for each TRP. Further, in the following description, the number of RSs used for beam failure detection is also referred to as the number of base RSs, and the number of RSs used for partial beam failure detection is also referred to as the number of determination criterion RSs.

<Option 1-1>

The option 1-1 configures the number of RSs for partial beam failure detection separately (or independently) for each TRP.

The base station may use a higher layer (for example, RRC signaling, etc.) to transmit information to the UE regarding the number of RSs (number of determination criterion RSs) that specify the partial beam failure detection corresponding to each TRP. For example, the base station may configure the same value (number of determination criterion RSs) or different values with respect to each TRP point. The UE controls partial beam failure detection in each TRP based on the information transmitted from the base station.

Further, the number of RSs configured for partial beam failure detection (number of determination criterion RSs) may be configured to be equal to or less than the number of RSs (number of base RSs) configured for beam failure detection detection.

The base station may configure whether or not partial beam failure detection is applied for each TRP. For example, partial beam failure detection may be configured in (applied to) one TRP #X and partial beam failure detection may not be configured in (applied to) another TRP #Y. In this case, the UE may control the partial beam failure detection based on the information regarding the number of RSs (number of determination criterion RSs) reported from the base station with respect to the TRP for which the partial beam failure detection is configured. Such a structure can be applied to other options as well.

For example, the UE determines that partial beam failure is detected in a certain TRP on the basis of the number of RSs of which radio link quality is less than the given threshold value (or equal to or less than the given threshold value) and the number of RSs for partial beam failure detection (number of determination criterion RSs) configured by the base station. When the number of RSs of which radio link quality is less than the given threshold value is equal to or greater than the number of determination criterion RSs configured by the base station, the UE determines that partial beam failure is detected and gives an instruction from a lower layer to a higher layer to that effect (beam failure). Such UE operation can be applied to other options as well.

Figure 2:
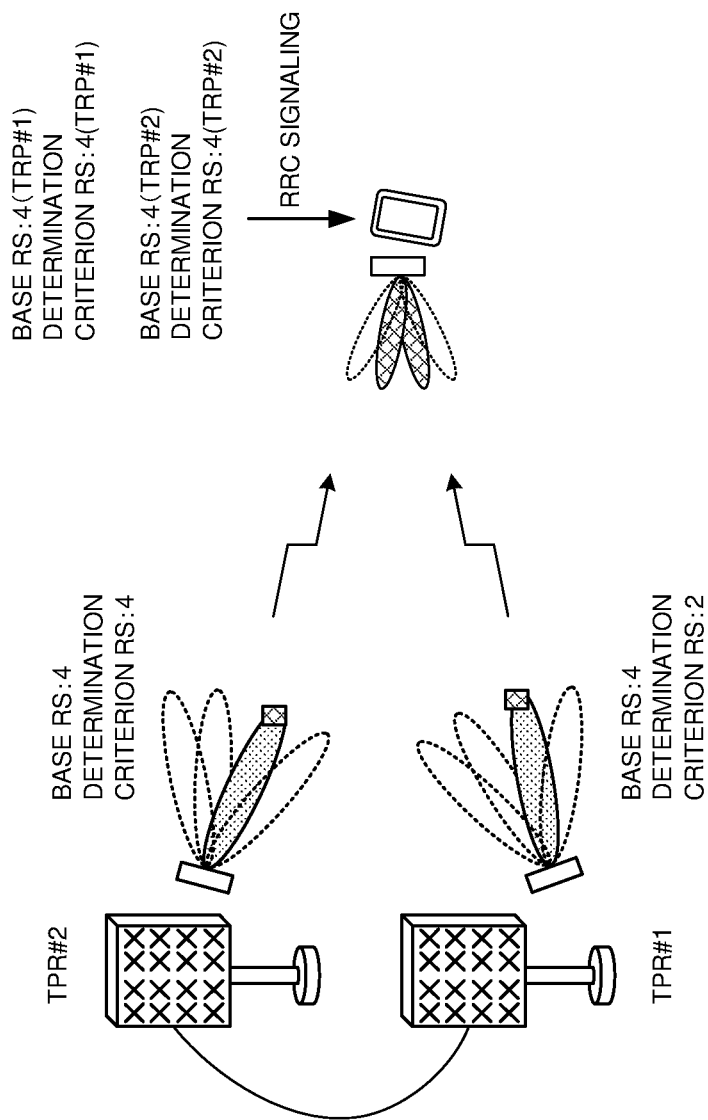
FIG. 2 is a diagram showing an example of partial beam failure detection.

FIG. 2 shows an example of the case where the number of RSs (determination criterion RS) for partial beam failure detection is configured separately for a plurality of TRPs (here, TRP #1 and TRP #2). In FIG. 2, TRP #1 may be a serving TRP and TRP #2 may be a coordinated TRP. Further, here, the case where four base RSs for beam failure detection are configured for TRP #1 and TRP #2 is shown. Note that the number of TRPs and the number of base RSs are not limited to this.

For example, two determination criterion RSs are configured for TRP #1, and four determination criterion RSs are configured for TRP #2. In this case, the UE determines that partial beam failure is detected when the radio link quality is equal to or less than the given threshold value in two or more of the four base RSs for TRP #1. On the other hand, the UE determines that (partial) beam failure is detected when the radio link quality is equal to or less than the given threshold value in four of the four base RSs for TRP #2.

When the UE determines that partial beam failure is detected, the UE gives an instruction to the lower layer to the higher layer that (partial) beam failure is detected. In addition, the TRP index may also be reported in the instruction of (partial) beam failure detection from the lower layer to the higher layer.

Alternatively, for some TRPs, it may not be necessary to configure the number of RSs (determination criterion RSs) for partial beam failure detection. For example, the base station configures four RSs (base RSs) for beam failure detection and configures two RSs (determination criterion RSs) for partial beam failure detection for TRP #1. On the other hand, the base station may configure four base RSs and not configure the number of determination criterion RSs for TRP #2.

In this case, the UE may assume that partial beam failure detection is performed in TRP #1 and not in TRP #2. That is, the UE may determine, regarding whether or not partial beam failure detection is applied, on the basis of the number of determination criterion RSs (or the number of determination criterion RSs and the number of base RSs) configured for each TRP. For example, when the number of determination criterion RSs and the number of base RSs are the same in a certain TRP, it may be assumed that partial beam failure detection is not performed for the TRP.

In this way, when the number of RSs for partial beam failure detection can be separately configured with respect to each TRP, it is possible to flexibly control the partial beam failure detection with respect to each TRP.

<Option 1-2>

The option 1-2 configures only one piece of information regarding the number of RSs for partial beam failure detection (number of determination criterion RSs). The UE determines the number of determination criterion RSs for each TRP on the basis of the information regarding one RS for partial beam failure detection reported from the base station.

The base station may use the higher layer (for example, RRC signaling) to transmit a given number (for example, one) of pieces of information regarding the number of RSs for partial beam failure detection to the UE regardless of the number of TRPs used by the UE. Further, the number of determination criterion RSs configured for partial beam failure detection may be configured to be equal to or less than the number of base RSs configured for beam failure detection detection.

The UE performs partial beam failure detection in each TRP based on the information transmitted from the base station. For example, the UE may apply the number of determination criterion RSs of one type transmitted from the base station to all TRPs. That is, the UE may assume that the same number of RSs (number of determination criterion RSs) is configured for each TRP.

Figure 3:
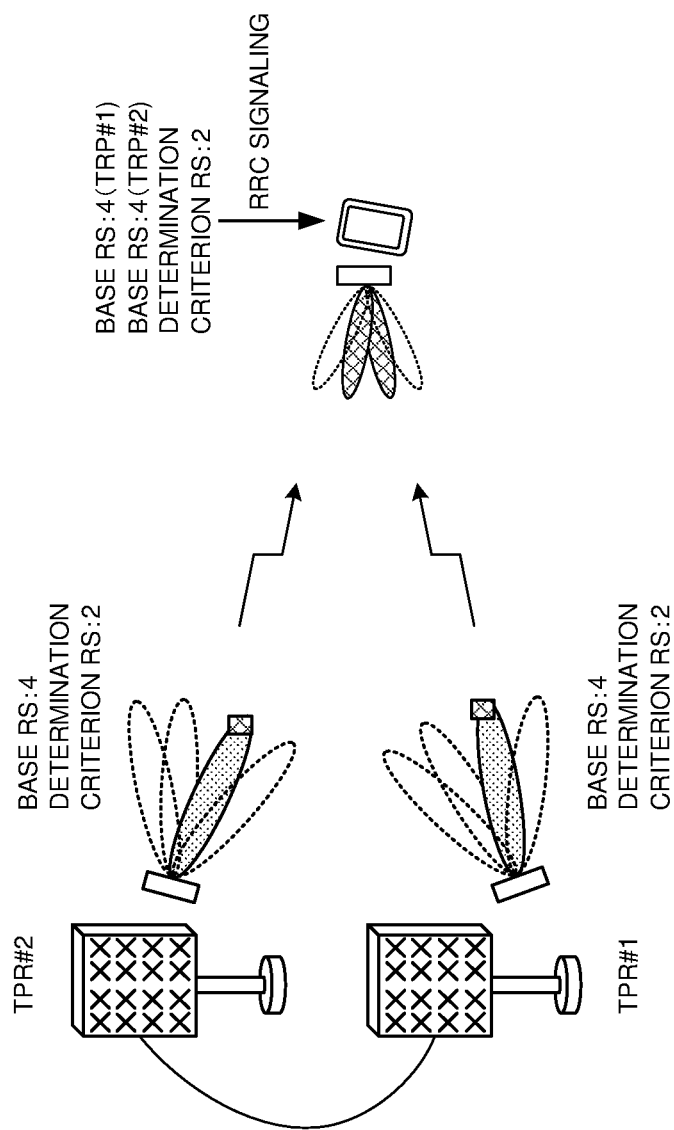
FIG. 3 is a diagram showing another example of partial beam failure detection.

FIG. 3 shows an example of the case where the same value is configured as the number of determination criterion RSs for a plurality of TRPs (here, TRP #1 and TRP #2). In FIG. 3, TRP #1 may be a serving TRP and TRP #2 may be a coordinated TRP. Further, here, the case where four base RSs for beam failure detection are configured for TRP #1 and TRP #2 is shown. Note that the number of TRPs and the number of base RSs are not limited to this.

For example, the base station configures one value in the UE as the number of determination criterion RSs. Here, the case where the number of determination criterion RSs is configured to two is shown. Based on the information transmitted from the base station (here, two), the UE determines that the number of determination criterion RSs corresponding to TRP #1 and TRP #2 is two. That is, the UE performs partial beam failure detection on the assumption that the number of determination criterion RSs for each TRP is the same.

In FIG. 3, two determination criterion RSs are configured for TRP #1 and TRP #2. In this case, the UE determines that partial beam failure is detected when the radio link quality is equal to or less than the given threshold value in two or more of the four base RSs for TRP #1. Similarly, the UE determines that partial beam failure is detected when the radio link quality is equal to or less than the given threshold value in two or more of the four base RSs for TRP #2.

When the UE determines that partial beam failure is detected, the UE gives an instruction to the lower layer to the higher layer that partial beam failure is detected. In addition, the TRP index may also be instructed in the report of partial beam failure detection from the lower layer to the higher layer.

In this way, it is possible to reduce the overhead by reducing the information regarding the number of RSs for partial beam failure detection transmitted from the base station to the UE.

<Variations>

The UE may determine the number of determination criterion RSs corresponding to each TRP on the basis of the information regarding the number of determination criterion RSs of a given number (for example, one) transmitted from the base station and given conditions (for example, offset).

For example, the UE may assume that one determination criterion RS transmitted from the base station corresponds to a given TRP (for a given TRP). The given TRP may be determined based on at least one of the TRP index, the antenna port index, the cell index, and the CC index. For example, the UE may assume that the one RS for partial beam failure detection transmitted from the base station corresponds to the TRP having the smallest TRP index.

The UE may determine the number of RSs for partial beam failure detection of other TRPs by applying a given condition (for example, a given offset) to the one RS for partial beam failure detection transmitted from the base station.

As an example, it is assumed that partial beam failure detection is configured to TRP #1 to TRP #4 for the UE. The UE applies, for example, the number of RSs (e.g., one) for partial beam failure detection transmitted from the base station to TRP #1. Further, for the other TRP #2 to #4, the value obtained by adding the given offset to the number of RSs (e.g., one) for partial beam failure detection transmitted from the base station is applied. When the given offset is one, the UE determines that the number of RSs for partial beam failure detection in TRP #2 to #4 is two.

Alternatively, the UE may add the given offset to the number of RSs (one) for partial beam failure detection transmitted from the base station so that the number is in ascending order based on the TRP index order for the other TRP #2 to #4. When the given offset is one, the number of RSs for partial beam failure detection in TRP #2 is two (TRP #1 value 1+given offset 1), the number of RSs for partial beam failure detection in TRP #3 is three (TRP #2 value 2+given offset 1), and the number of RSs for partial beam failure detection of TRP #4 may be four (TRP #3 value 3+given offset 1).

Note that the value of the given offset is not limited to one, but may be another value. Further, the value of the given offset may be defined in advance by the specifications, or may be reported from the base station to the UE by using an higher layer (for example, RRC signaling, broadcast signal, etc.).

As a result, even when the base station reports to the UE of one RS for partial beam failure detection, the number of RSs for partial beam failure detection in each TRP can be flexibly configured.

<Option 1-3>

The option 1-3 commonly configures, for a plurality of TRPs, information regarding the number of (e.g., only one) RSs for partial beam failure detection (number of determination criterion RSs). The UE determines the number of RSs for partial beam failure detection over a plurality of TRPs based on the information regarding the one RS for partial beam failure detection reported from the base station, and performs partial beam failure detection.

The base station may use a higher layer (e.g., RRC signaling, etc.) to transmit to the UE the information regarding the number of RSs for partial beam failure detection applied across a plurality of TRPs. Further, the number of determination criterion RSs configured for partial beam failure detection may be configured to be equal to or less than the number of base RSs configured for beam failure detection detection.

The UE performs partial beam failure detection across the plurality of TRPs based on the information transmitted from the base station. For example, the UE may determine partial beam failure detection based on the number of determination criterion RSs transmitted from the base station and the total number of RSs of which radio link quality is equal to or less than the given threshold value in each TRP.

Figure 4:
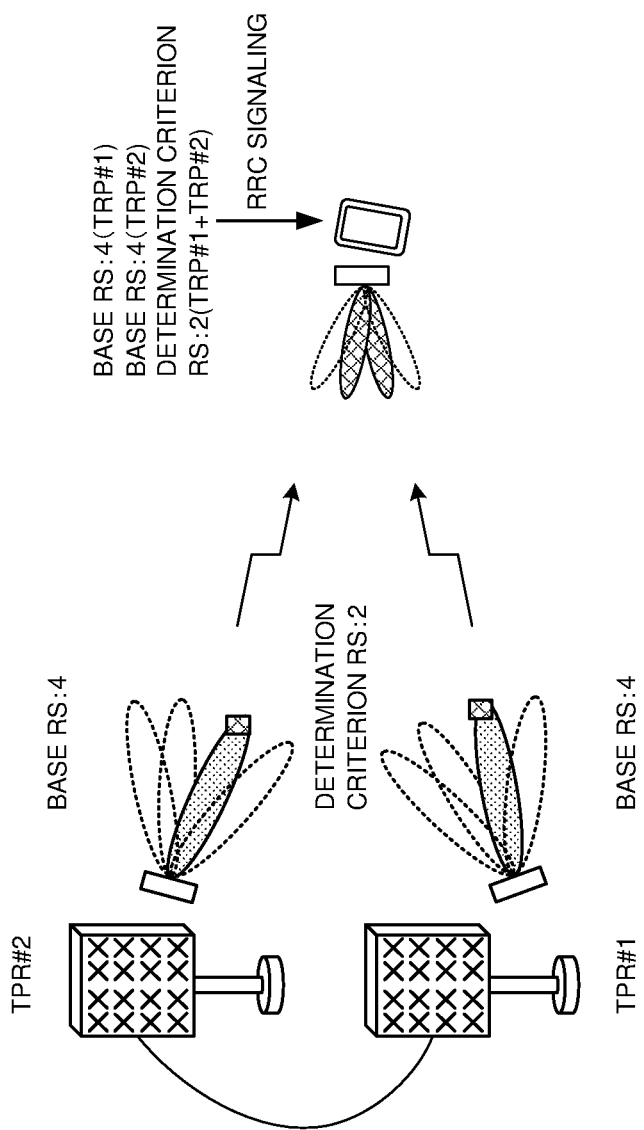
FIG. 4 is a diagram showing another example of partial beam failure detection.

FIG. 4 shows an example of the case where the number of determination criterion RSs is configured for the plurality of TRPs (here, TRP #1 and TRP #2). In FIG. 4, TRP #1 may be a serving TRP and TRP #2 may be a coordinated TRP. Further, here, the case where four base RSs for beam failure detection are configured for TRP #1 and TRP #2 is shown. Note that the number of TRPs and the number of base RSs are not limited to this.

For example, the base station configures one value in the UE over TRP #1 and TRP #2 as the number of determination criterion RSs. Here, the case where the number of determination criterion RSs is configured to two is shown. Based on the information transmitted from the base station (here, two), the UE assumes that the number of determination criterion RSs configured over TRP #1 and TRP #2 is two and performs partial beam failure detection.

In FIG. 4, the UE determines that partial beam failure is detected when the radio link quality is equal to or less than the given threshold value in two or more of the four base RSs for TRP #1 and four base RSs for TRP #2 (eight base RSs in total). For example, when the radio link quality is less than the given threshold value in one RS of TRP #1 and one RS of TRP #2, it is determined that partial beam failure is detected.

When the UE determines that partial beam failure is detected, the UE gives an instruction to the lower layer to the higher layer that partial beam failure is detected. Further, in the option 1-3, the TRP index may not be reported in the report of partial beam failure detection from the lower layer to the higher layer. That is, in the option 1-3, partial beam failure detection can be performed without being associated with TRPs.

In this way, it is possible to reduce the overhead by reducing the information regarding the number of RSs for partial beam failure detection transmitted from the base station to the UE.

Note that FIG. 4 shows a case where four RSs (base RSs) for beam failure detection are configured for each of TRP #1 and TRP #2, but the case is not limited to this. For example, a base RS for beam failure detection may be configured across TRP #1 and TRP #2. As an example, the number of base RSs and the number of determination criterion RSs may be configured across TRP #1 and TRP #2 (see FIG. 5).

Figure 5:
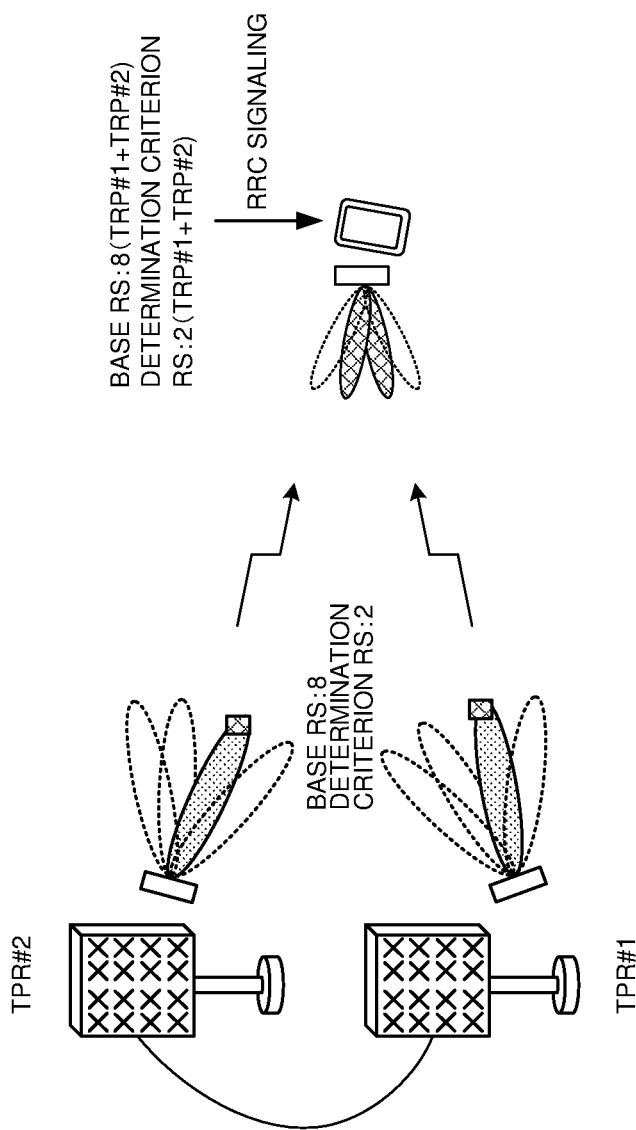
FIG. 5 is a diagram showing another example of partial beam failure detection.

FIG. 5 shows a case where eight base RSs for beam failure detection are configured and two determination criterion RSs for partial beam failure detection are configured across TRP #1 and TRP #2. The UE may determine that partial beam failure is detected when the radio link quality is equal to or less than the given threshold value in two or more of the eight base RSs configured across TRP #1 and TRP #2.

By applying the partial beam failure detection over the plurality of TRPs in this way, it is possible to reconfigure the beam in consideration of the entire TRP to be configured.

<Option 1-4>

The option 1-4 is configured such that partial beam failure detection is performed only in a given TRP (for example, serving TRP).

The base station may use the higher layer (for example, RRC signaling) to transmit the information regarding the number of RSs for partial beam failure detection (determination criterion RS) used in the given TRP to the UE regardless of the number of TRPs used by the UE. That is, the information regarding the number of determination criterion RSs may be configured only for the given TRP. Further, the number of determination criterion RSs may be configured to be equal to or less than the number of base RSs configured for beam failure detection detection.

The UE may assume that partial beam failure detection is performed only in the given TRP (e.g., serving TRP). In this case, the number of RSs for partial beam failure detection for the given TRP is determined based on the information regarding the number of RSs for partial beam failure detection reported from the base station.

The UE performs partial beam failure detection in the given TRP based on the information transmitted from the base station. The UE may apply, for example, the number of RSs for partial beam failure detection of one type transmitted from the base station to the given TRP.

Figure 6:
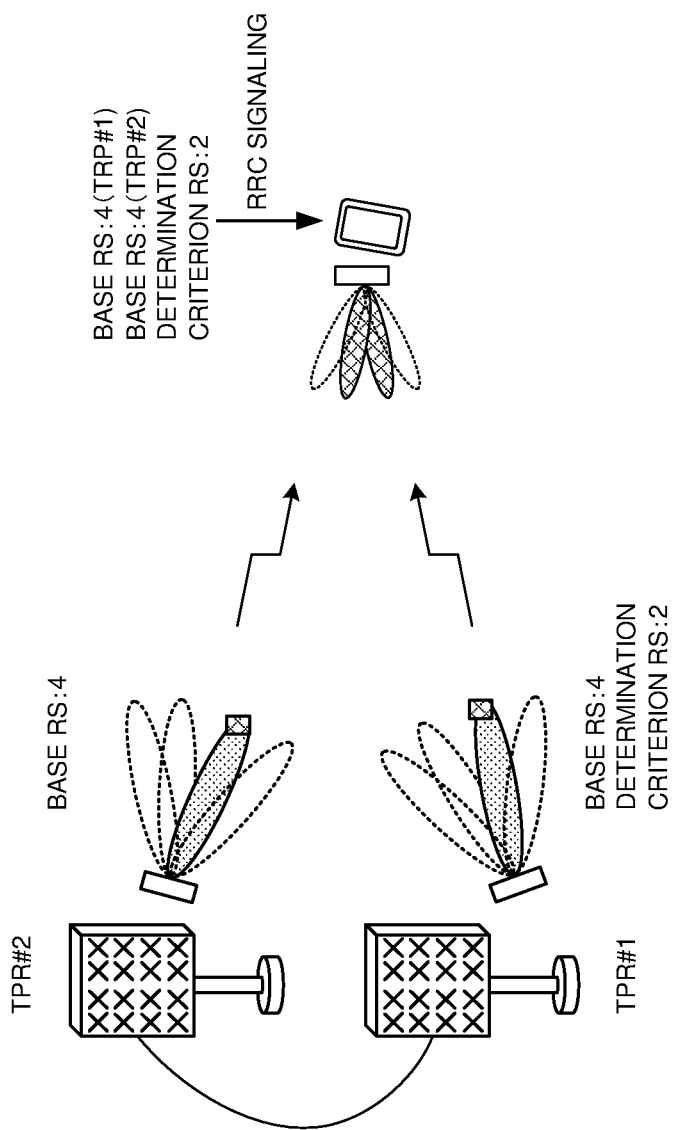
FIG. 6 is a diagram showing another example of partial beam failure detection.

FIG. 6 shows an example of the case where partial beam failure detection is applied to the given TRP (here, TRP #1) among a plurality of TRPs (here, TRP #1 and TRP #2). In FIG. 6, TRP #1 may be a serving TRP and TRP #2 may be a coordinated TRP. Further, here, the case where four RSs (base RSs) for beam failure detection are configured for TRP #1 and TRP #2 is shown. Note that the number of TRPs and the number of base RSs are not limited to this.

For example, the base station configures one value in the UE as the number of RSs for partial beam failure detection (determination criterion RSs). Here, the case where the number of RSs for partial beam failure detection is configured to be two is shown. Based on the information transmitted from the base station (here, two), the UE determines that the number of RSs for partial beam failure detection corresponding to TRP #1 is two.

In FIG. 6, two determination criterion RSs are configured for TRP #1. In this case, the UE determines that partial beam failure is detected when the radio link quality is equal to or less than the given threshold value in two or more of the four base RSs for TRP #1. On the other hand, the UE performs control so as not to perform the partial beam failure detection in TRP #2.

When the UE determines that partial beam failure is detected, the UE gives an instruction to the lower layer to the higher layer that partial beam failure is detected. In addition, the TRP index may not be instructed in the report of partial beam failure detection from the lower layer to the higher layer.

In this way, by limiting the TRP to which the partial beam failure detection is applied, it is sufficient to configure the beam recovery and the like in detail only for a specific TRP, so that the load of UE operation can be reduced.

(Second Aspect)

The second aspect describes the transmission control of the recovery request when a partial beam failure for a certain TRP is detected. The recovery request may be referred to as recovery request, beam recovery request, beam failure recovery request, or beam recovery request.

The UE can apply one of the following options 2-1 to 2-3 when transmitting a recovery request based on partial beam failure detection. In addition, the UE may transmit the recovery request using at least one of MAC control element (MAC CE) and uplink control information (UCI). The UE may use an uplink shared channel (e.g., PUSCH) to transmit a MAC control element. In addition, the UE may use an uplink control channel (e.g., PUSCH) or the PUSCH to transmit uplink control information.

<Option 2-1>

In the option 2-1, the UE transmits a recovery request to the TRP for which partial beam failure has been detected when detecting the partial beam failure for the TRP (determining that partial beam failure is detected). For example, the UE transmits a recovery request to the TRP for which partial beam failure has been detected by using an available beam. The available beam may be a beam of which radio link quality is not less than the given threshold value (or a beam equal to or greater than the given threshold value) in the TRP for which partial beam failure has been detected.

The available beam may be any beam having a radio link quality of a given value or higher, and may be referred to as an available link, an alive beam, or an alive link.

Figure 7:
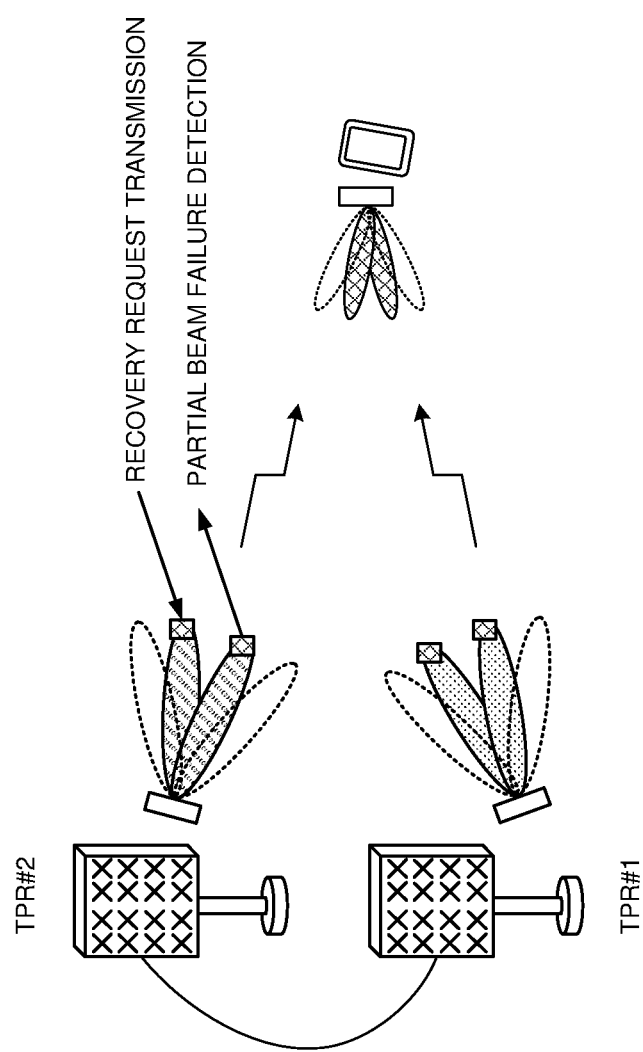
FIG. 7 is a diagram showing an example of transmission of a recovery request for partial beam failure detection.

FIG. 7 shows an example of the case where the UE transmits a recovery request based on partial beam failure detection for a given TRP when communicating using a plurality of TRPs (here, TRP #1 and TRP #2). In FIG. 7, TRP #1 may be a serving TRP and TRP #2 may be a coordinated TRP.

FIG. 7 shows the case where the UE has detected partial beam failure in TRP #2. In such a case, the UE transmits a recovery request to TRP #2 for which partial beam failure has been detected. For example, the UE uses an available beam in TRP #2 (e.g., a beam with the highest radio link quality) to transmit a recovery request with at least one of MAC CE and UCI.

In this way, by transmitting a recovery request to the given TRP for which partial beam failure has been detected, it is possible to perform the operation of the partial beam failure detection by using the given TRP. As a result, the operation of partial beam failure detection can be simplified and the load of UE operation can be reduced.

Note that when there is no available beam (alive beam) in the TRP for which partial beam failure has been detected, the recovery request may be transmitted using a random access channel or a beam of another TRP.

<Option 2-2>

In the option 2-2, the UE transmits a recovery request to a TRP different from the TRP for which partial beam failure has been detected when detecting the partial beam failure for a certain TRP (determining that partial beam failure is detected). For example, the UE transmits a recovery request to a TRP different from the TRP for which partial beam failure has been detected by using an available beam. The available beam may be a beam used in a TRP other than the TRP for which partial beam failure has been detected.

Figure 8:
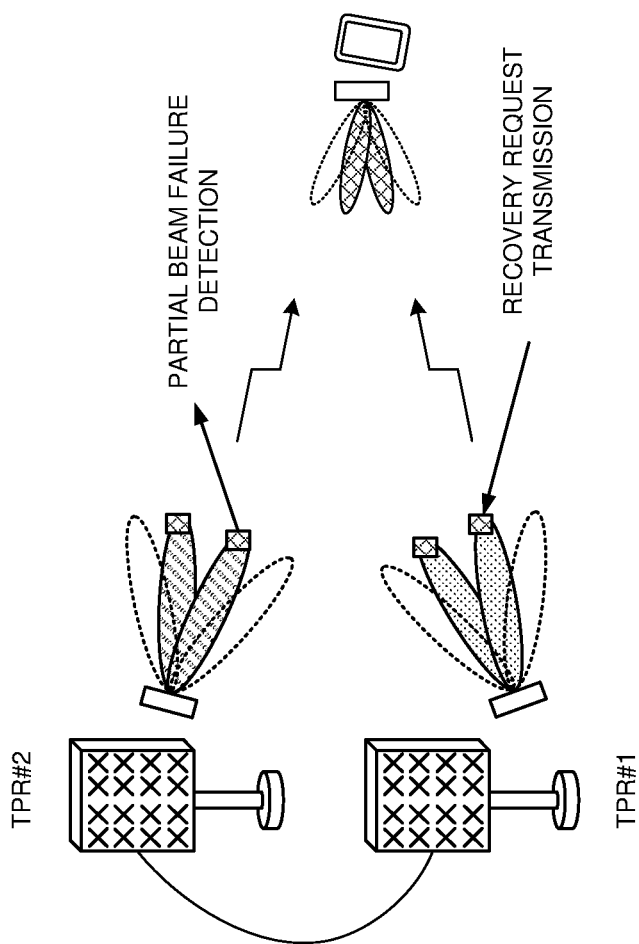
FIG. 8 is a diagram showing another example of transmission of a recovery request for partial beam failure detection.

FIG. 8 shows an example of the case where the UE transmits a recovery request based on partial beam failure detection for a given TRP when communicating using a plurality of TRPs (here, TRP #1 and TRP #2). In FIG. 8, TRP #1 may be a serving TRP and TRP #2 may be a coordinated TRP.

FIG. 8 shows the case where the UE has detected partial beam failure in TRP #2. In such a case, the UE transmits a recovery request to TRP #1 different from TRP #2 for which partial beam failure has been detected. For example, the UE uses an available beam in TRP #1 (e.g., a beam with the highest radio link quality) to transmit a recovery request with at least one of MAC CE and UCI.

In this way, by transmitting a recovery request to a TRP other than the given TRP for which partial beam failure has been detected, it is possible to increase the number of available beam candidates for transmission of the recovery request, and the recovery request can be transmitted flexibly.

Note that when there is no available beam (alive beam) in other TRPs, a recovery request may be transmitted using a random access channel.

<Option 2-3>

In the option 2-3, when detecting partial beam failure (determining that partial beam failure is detected) for a certain TRP, the UE transmits a recovery request to a preliminarily configured given TRP (also called fixed TRP) or any TRP where there is an available beam. For example, the UE transmits a recovery request to a predefined fixed TRP regardless of the TRP for which partial beam failure has been detected by using an available beam. When there is no available beam in the fixed TRP, transmission may be performed to another TRP.

Figure 9:
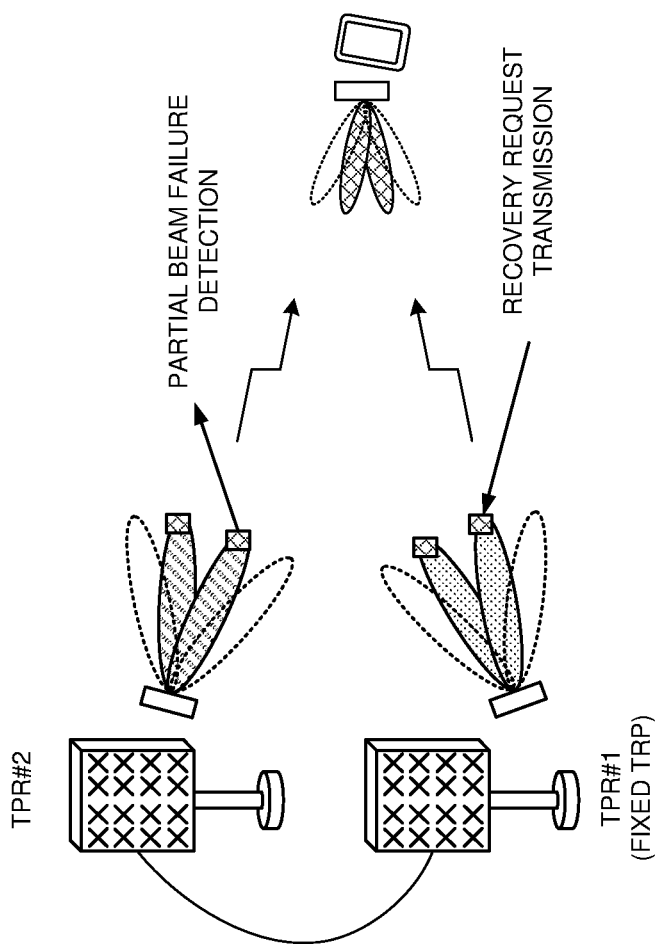
FIG. 9 is a diagram showing another example of transmission of a recovery request for partial beam failure detection.

FIG. 9 shows an example of the case where the UE transmits a recovery request based on partial beam failure detection for a given TRP when communicating using a plurality of TRPs (here, TRP #1 and TRP #2). In FIG. 9, TRP #1 may be a serving TRP and TRP #2 may be a coordinated TRP.

FIG. 9 shows the case where the UE has detected partial beam failure in TRP #2. In such a case, the UE transmits a recovery request to the predefined fixed TRP (here, TRP #1). For example, the UE uses an available beam in TRP #1 (e.g., a beam with the highest radio link quality) to transmit a recovery request with at least one of MAC CE and UCI.

The predefined fixed TRP may be defined by the specifications, or may be reported to the UE from the base station. Alternatively, the fixed TRP may be determined based on a TRP index, a CC index, a cell index, or the like. For example, the UE may determine the TRP with the smallest index as a fixed TRP.

In this way, by transmitting a recovery request for partial beam failure detection to a predefined TRP, it is possible to simplify the operation of partial beam failure detection and reduce the load of the UE operation.

(Third Aspect)

The third aspect describes the transmission control of the recovery request when a partial beam failure not associated with a specific TRP is detected. For example, the third aspect is suitably available for the option 1-3 of the first aspect. Of course, the third applicable configuration is not limited to this.

When detecting partial beam failure not associated with the TRP, the UE may use an available beam (alive beam) to transmit a recovery request to at least one TRP. The TRP to which transmission is performed may be determined based on the radio link quality corresponding to the beam or may be determined based on other conditions (e.g., TRP index).

For example, the UE uses an available beam for a given TRP to transmit at least one of the MAC control element and the downlink control information (PDSCH and PUCCH) including the recovery request.

In this way, by transmitting a recovery request for partial beam failure detection to the given TRP by using any available beam, it is possible to transmit the recovery request by using at least one of the MAC control element and the downlink control information. As a result, it is possible to suppress the delay in report of the recovery request and improve the resource use efficiency.

Alternatively, the UE may transmit a recovery request to the preliminarily configured given TRP (also referred to as fixed TRP) when detecting partial beam failure not associated with the TRP. The fixed TRP may be a serving TRP or may be a TRP preliminarily configured in the UE from the base station.

For example, when there is an available beam in the preliminarily configured fixed TRP, the UE uses the available beam to transmit at least one of the MAC control element and the downlink control information (PDSCH and PUCCH) including the recovery request to the fixed TRP. On the other hand, when there is an available beam in the preliminarily configured fixed TRP, the UE uses a PRACH to transmit the recovery request to the fixed TRP.

FIGS. 10A to 10C show an example of the case where the UE transmits a recovery request based on partial beam failure detection for TRP #1 and TRP #2 when communicating using a plurality of TRPs (here, TRP #1 and TRP #2). In FIGS. 10A to 10C, TRP #1 may be a serving TRP and TRP #2 may be a coordinated TRP.

In FIG. 10A, the UE determines that partial beam failure is detected when the radio link quality is equal to or less than the given threshold value in two or more of the four base RSs for TRP #1 and four base RSs for TRP #2 (eight base RSs in total) (see the option 1-3 above).

When the UE detects a partial beam failure across TRP #1 and TRP #2, it transmits a recovery request to a predefined TRP (here, TRP #1). For example, when there is an available beam in TRP #1, the UE uses the available beam to transmit a recovery request with at least one of MAC CE and UCI (see FIG. 10B). As a result, the recovery request can be transmitted at high speed.

The predefined TRP (fixed TRP) may be defined by the specifications, or may be reported to the UE from the base station. Alternatively, the fixed TRP may be determined based on a TRP index, a CC index, a cell index, or the like. For example, the UE may determine the TRP with the smallest index as a fixed TRP.

On the other hand, when there is no available beam in TRP #1, the UE uses a PRACH to transmit the recovery request to TRP #1 (see FIG. 10C). Thus, it is possible to transmit a recovery request based on partial beam failure detection even when there is no available beam.

Further, by transmitting a recovery request for partial beam failure detection to a predefined TRP, it is possible to simplify the operation of partial beam failure detection and reduce the load of the UE operation.

(Radio Communication System)

Now, the structure of a radio communication system according to the present embodiment will be described below. In this radio communication system, communication is performed using at least one combination of the above-mentioned plurality of aspects.

Figure 11:
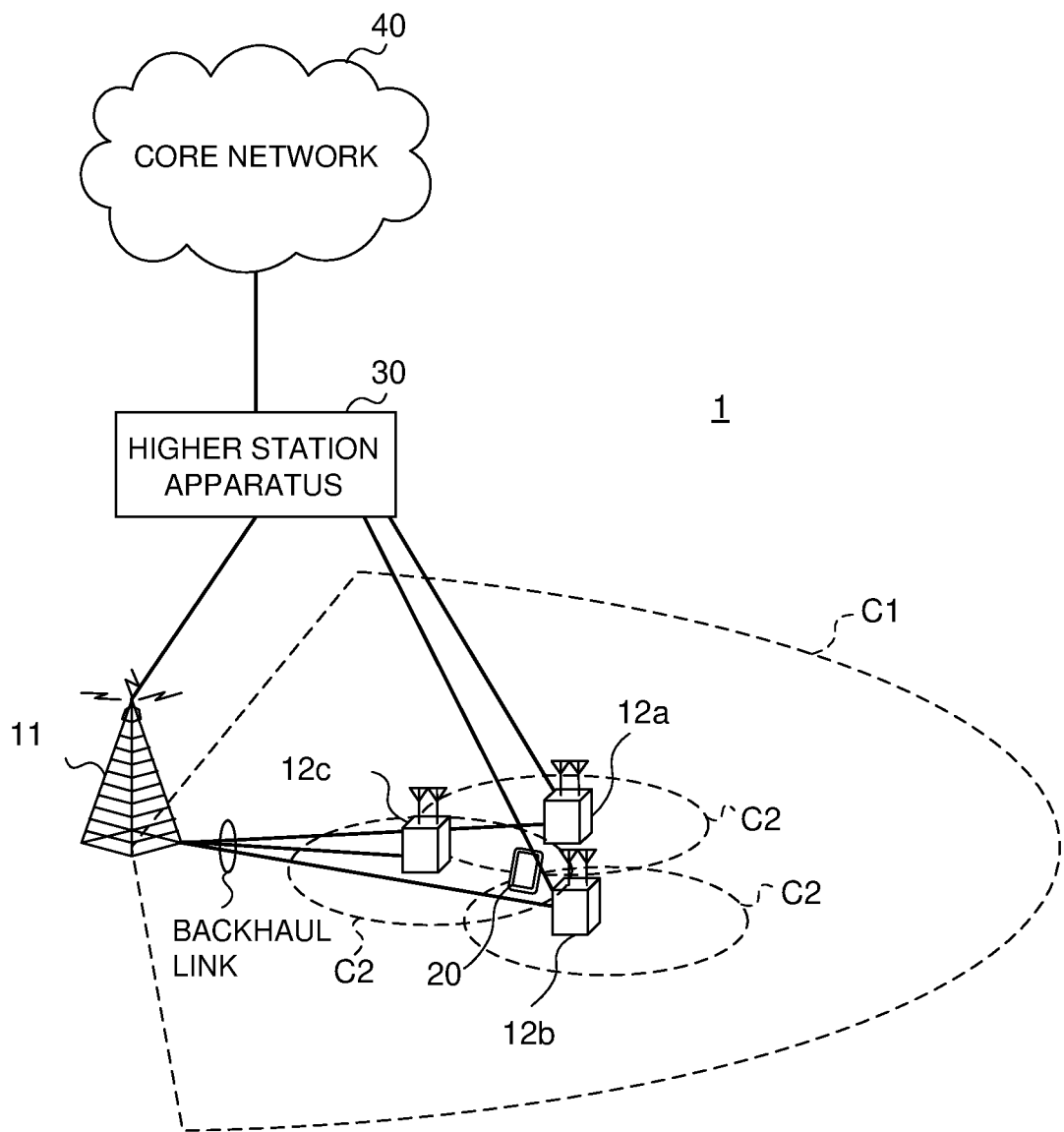
FIG. 11 is a diagram showing an example of a schematic structure of a radio communication system according to the present embodiment.

FIG. 11 is a diagram showing an example of a schematic configuration of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)", "LTE-A (LTE-Advanced)", "LTE-B (LTE-Beyond)", "SUPER 3G", "IMT-Advanced", "4G (4th generation mobile communication system)", "5G (5th generation mobile communication system)", "NR (New Radio)", "FRA (Future Radio Access)", "New-RAT (Radio Access Technology)", and so on, or may be seen as a system to implement these.

The radio communication system 1 includes a radio base station 11 that forms a macro cell C1 covering a relatively wide coverage, and radio base stations 12 (12a to 12c) that are placed within the macro cell C1 and that form small cells C2, which are narrower than the macro cell C1. Also, user equipment (user terminals) 20 are placed in the macro cell C1 and in each small cell C2. The arrangement, number and so on of cells and user equipment 20 are not limited to an aspect shown in the drawings.

The user equipment 20 can connect with both the radio base station 11 and the radio base stations 12. The user equipment 20 may use the macro cell C1 and the small cells C2 simultaneously using CA or DC. Furthermore, the user equipment 20 may apply CA or DC using a plurality of cells (CCs) (for example, five or fewer CCs or six or more CCs).

Between the user equipment 20 and the radio base station 11, communication can be carried out using a carrier of a relatively low frequency band (for example, 2 GHz) and a narrow bandwidth (referred to as an "existing carrier", a "legacy carrier" and so on). Meanwhile, between the user equipment 20 and the radio base stations 12, a carrier of a relatively high frequency band (for example, 3.5 GHz, 5 GHz, and so on) and a wide bandwidth may be used, or the same carrier as that used between the user equipment 20 and the radio base station 11 may be used. Note that the structure of the frequency band for use in each radio base station is by no means limited to these.

Moreover, the user equipment 20 can perform communication in each cell using time division duplex (TDD) and/or frequency division duplex (FDD). Further, in each cell (carrier), a single numerology may be applied, or a plurality of different numerologies may be applied.

The numerology may be a communication parameter applied to transmission and/or reception of a signal and/or a channel, and may indicates, for example, at least one of the subcarrier interval, the bandwidth, symbol length, the cyclic prefix length, the subframe length, the TTI length, the number of symbols per TTI, the radio frame configuration, the filtering processing, the windowing processing, and so on.

The radio base station 11 and the radio base station (or between 2 radio base stations 12) may be connected by wire (for example, means in compliance with the common public radio interface (CPRI) such as optical fiber, an X2 interface, and so on) or wirelessly.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station", an "aggregate node", an "eNB (eNodeB)", a "transmission/reception point" and so on. Also, the radio base stations 12 are radio base stations having local coverages, and may be referred to as "small base stations", "micro base stations", "pico base stations", "femto base stations", "HeNBs (Home eNodeBs)", "RRHs (Remote Radio Heads)", "transmission/reception points" and so on. Hereinafter the radio base stations 11 and 12 will be collectively referred to as "radio base stations 10", unless specified otherwise.

The user equipment 20 is equipment to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single carrier communication scheme to mitigate interference between equipment by dividing the system bandwidth into bands configured with one or continuous resource blocks per equipment, and allowing a plurality of equipment to use mutually different bands. Note that the uplink and downlink radio access schemes are not limited to the combinations of these, and other radio access schemes can be used as well.

In the radio communication system 1, a downlink shared channel (PDSCH (Physical Downlink Shared CHannel)), which is used by each user equipment 20 on a shared basis, a broadcast channel (PBCH (Physical Broadcast CHannel)), downlink L1/L2 control channels and so on are used as downlink channels. User data, higher layer control information and SIBs (System Information Blocks) are transmitted in the PDSCH. Further, MIB (Master Information Block) is transmitted by PBCH.

The downlink L1/L2 control channels include at least one of a downlink control channel (PDCCH (Physical Downlink Control CHannel) and/or an EPDCCH (Enhanced Physical Downlink Control CHannel)), a PCFICH (Physical Control Format Indicator CHannel), and a PHICH (Physical Hybrid-ARQ Indicator CHannel). Downlink control information (DCI), including PDSCH and/or PUSCH scheduling information, and so on, is transmitted by the PDCCH.

Note that scheduling information may be reported via DCI. For example, the DCI to schedule receipt of DL data may be referred to as "DL assignment", and the DCI to schedule transmission of UL data may be referred to as "UL grant".

The number of OFDM symbols to use for the PDCCH is communicated by the PCFICH. HARQ (Hybrid Automatic Repeat reQuest) delivery acknowledgement information (also referred to as, for example, "retransmission control information", "HARQ-ACKs", "ACK/NACKs" and so on) in response to the PUSCH is communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user equipment 20 on a shared basis, an uplink control channel (PUCCH (Physical Uplink Control Channel)), a random access channel (PRACH (Physical Random Access Channel)) and so on are used as uplink channels. User data, higher layer control information, and so on are communicated by the PUSCH. Also, in the PUCCH, downlink radio link quality information (CQI (Channel Quality Indicator)), delivery acknowledgement information, scheduling requests (SRs) and so on are communicated. By means of the PRACH, random access preambles for establishing connections with cells are communicated.

In the radio communication systems 1, cell-specific reference signal (CRSs), channel state information reference signal (CSI-RSs), demodulation reference signal (DMRSs), positioning reference signal (PRSs) and so on are communicated as downlink reference signals. Also, in the radio communication system 1, measurement reference signals (Sounding Reference Signals (SRSs)), demodulation reference signals (DMRSs), and so on are communicated as uplink reference signals. Note that, DMRSs may be referred to as "user equipment-specific reference signals (UE-specific Reference Signals)". Also, the reference signals to be communicated are by no means limited to these.

<Radio Base Station>

Figure 12:
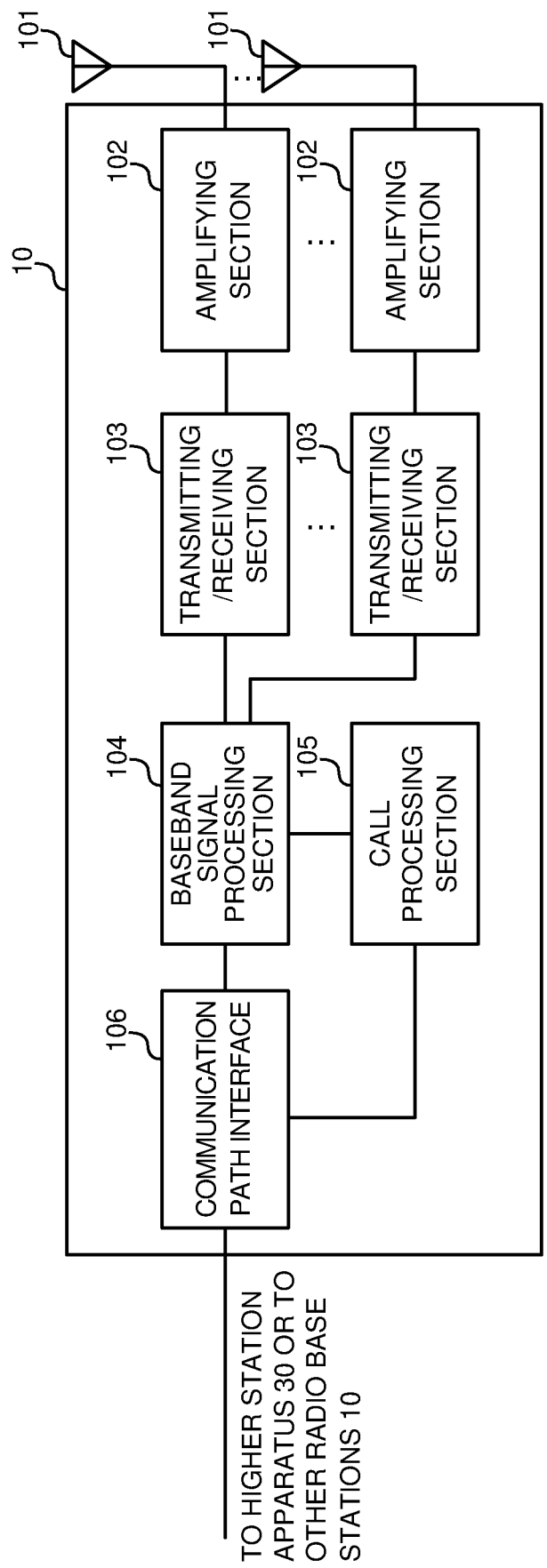
FIG. 12 is a diagram showing an example of an overall structure of a radio base station according to the present embodiment.

FIG. 12 is a diagram showing an example of an overall structure of the radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to the user equipment 20 on the downlink is input from the higher station apparatus 30 to the baseband signal processing section 104, via the communication path interface 106.

In the baseband signal processing section 104, the user data is subjected to transmission processing, including PDCP (Packet Data Convergence Protocol) layer processing, division and coupling of the user data, RLC (Radio Link Control) layer transmission processing such as RLC retransmission control, MAC (Medium Access Control) retransmission control (for example, an HARQ (Hybrid Automatic Repeat reQuest) transmission processing), scheduling, transport format selection, channel coding, inverse fast Fourier transform (IFFT) processing and precoding processing, and the result is forwarded to each transmitting/receiving section 103. Furthermore, downlink control signals are also subjected to transmission processing such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. A radio frequency signal subjected to the frequency conversion in each transmitting/receiving section 103 is amplified in the amplifying section 102, and transmitted from each transmitting/receiving antenna 101. The transmitting/receiving sections 103 can be constituted by a transmitter/receiver, a transmitting/receiving circuit or transmitting/receiving apparatus that can be described based on general understanding of the technical field to which the present disclosure pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to fast Fourier transform (FFT) processing, inverse discrete Fourier transform (IDFT) processing, error correction decoding, MAC retransmission control receiving processing, and RLC layer and PDCP layer receiving processing, and forwarded to the higher station apparatus 30 via the communication path interface 106. The call processing section 105 performs call processing (such as setting up and releasing communication channels), manages the state of the radio base stations 10 and manages the radio resources.

The communication path interface 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving section 103 may further include an analog beamforming section that performs analog beamforming. The analog beamforming section can be constituted by an analog beamforming circuit (for example, a phase shifter, a phase shift circuit) or an analog beamforming apparatus (for example, a phase shifter) described based on common understanding of the technical field to which the present invention pertains. Also, the transmitting/receiving antenna 101 can be constituted by an array antenna, for example. Also, the transmitting/receiving section 103 is configured such that that single BF and multi BF can be used.

The transmitting/receiving section 103 may transmit a signal using a transmission beam and may receive a signal using a reception beam. The transmitting/receiving section 103 may transmit and/or receive a signal using a given beam determined by the control section 301.

In addition, the transmitting/receiving section 103 transmits, to the user equipment 20, the downlink (DL) signal (including at least one of the DL data signal (downlink shared channel), the DL control signal (downlink control channel), and the DL reference signal), and receives, from the user equipment 20, the uplink (UL) signal (including at least one of the UL data signal, the UL control signal, and the UL reference signal).

Further, the transmitting/receiving section 103 may transmit information regarding the number or proportion of at least one of a beam, a link and a reference signal used to specify partial beam failure detection for one or more transmission/reception points. Further, the transmitting/receiving section 103 may transmit information regarding the number of reference signals (base reference signals) for beam failure detection to the UE by higher layer signaling in addition to the number or proportion of reference signals (criterion reference signals) for partial beam failure detection. Further, the transmitting/receiving section 103 receives a recovery request transmitted from the UE when partial beam failure detection occurs.

Figure 13:
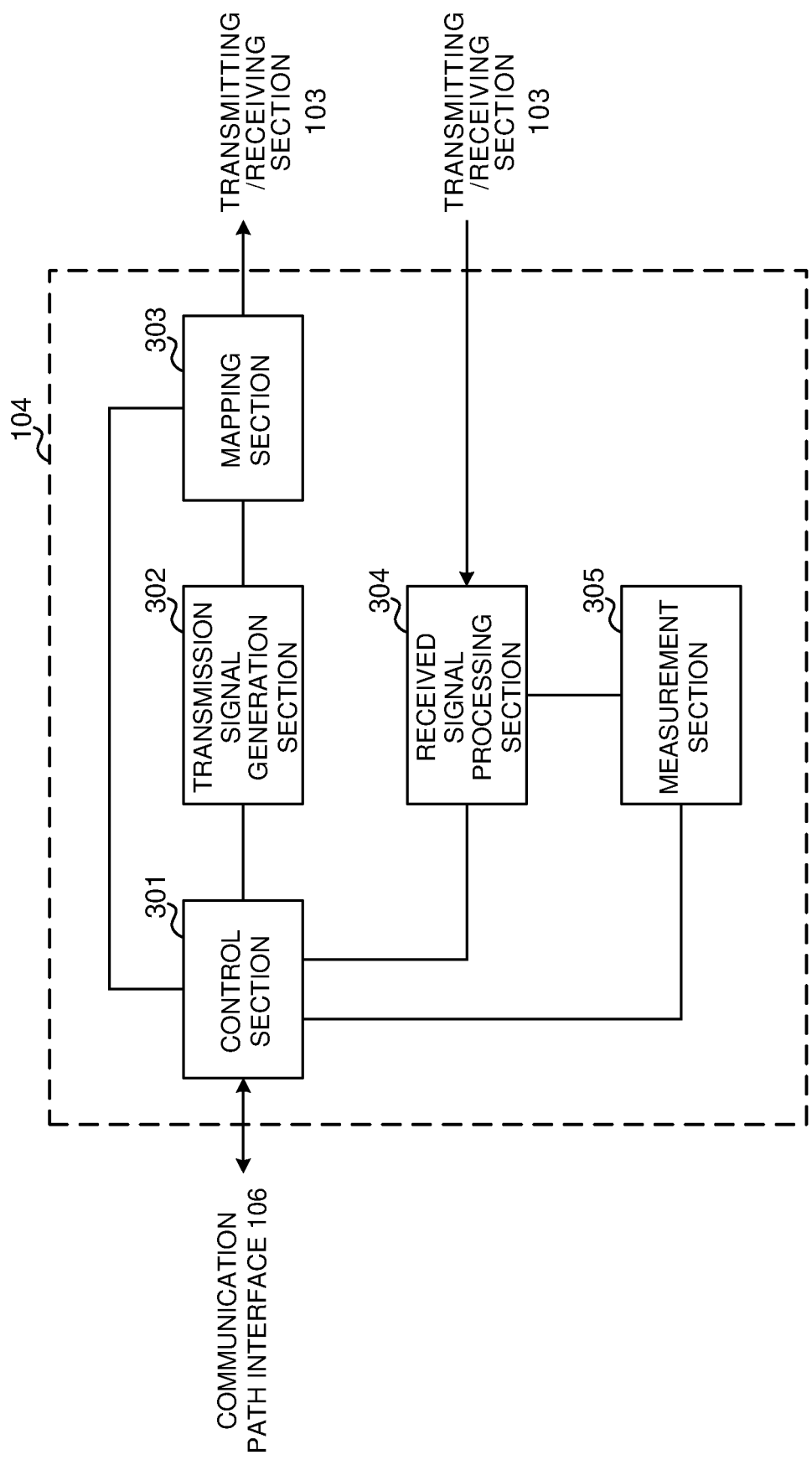
FIG. 13 is a diagram showing an example of a functional structure of a radio base station according to the present embodiment.

FIG. 13 is a diagram showing an example of a functional configuration of the radio base station according to the present embodiment. Note that, although this example will primarily show functional blocks that pertain to characteristic parts of the present embodiment, the radio base station 10 may be assumed to have other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present disclosure pertains.

For example, the control section 301 controls the generation of signals in the transmission signal generation section 302, the allocation of signals in the mapping section 303, and the like. Furthermore, the control section 301 controls the signal receiving processing in the received signal processing section 304, the measurements of signals in the measurement section 305, and so on.

The control section 301 controls the scheduling (for example, resource allocation) of system information, downlink data signals (for example, signals transmitted in the PDSCH), and downlink control signals (for example, signals that are transmitted in the PDCCH and/or the EPDCCH, such as delivery acknowledgement information). Scheduling (e.g., resource allocation) of delivery confirmation information). The control section 301 controls the generation of downlink control signals, downlink data signals and so on, based on the results of deciding whether or not retransmission control is necessary for uplink data signals, and so on.

The control section 301 may control the number or proportion of at least one of a beam, a link and a reference signal used to specify partial beam failure detection for one or more transmission/reception points.

The transmission signal generation section 302 generates downlink signals (downlink control signals, downlink data signals, downlink reference signals and so on) based on instructions from the control section 301, and outputs these signals to the mapping section 303. The transmission signal generation section 302 can be constituted by a signal generator, a signal generating circuit or signal generation apparatus that can be described based on general understanding of the technical field to which the present disclosure pertains.

For example, the transmission signal generation section 302 generates DL assignments, which report downlink data allocation information, and/or UL grants, which report uplink data allocation information, based on instructions from the control section 301. DL assignments and UL grants are both DCI, and follow the DCI format. Also, the downlink data signals are subjected to the coding processing, the modulation processing, and so on, by using coding rates and modulation schemes that are determined based on, for example, channel state information (CSI) reported from each user equipment 20.

The mapping section 303 maps the downlink signals generated in the transmission signal generation section 302 to given radio resources based on instructions from the control section 301, and outputs these to the transmitting/receiving sections 103. The mapping section 303 can be constituted by a mapper, a mapping circuit or mapping apparatus that can be described based on general understanding of the technical field to which the present disclosure pertains.

The received signal processing section 304 performs receiving processing (for example, demapping, demodulation, decoding and so on) of received signals that are input from the transmitting/receiving sections 103. Here, the received signals include, for example, uplink signals (uplink control signals, uplink data signals, uplink reference signals, etc.) that are transmitted from the user equipment 20. The received signal processing section 304 can be constituted by a signal processor, a signal processing circuit or signal processing apparatus that can be described based on general understanding of the technical field to which the present disclosure pertains.

The received signal processing section 304 outputs, to the control section 301, information decoded by the receiving processing. For example, when a PUCCH containing an HARQ-ACK is received, the HARQ-ACK is output to the control section 301. Also, the received signal processing section 304 outputs the received signals and/or the signals after the receiving processing to the measurement section 305.

The measurement section 305 conducts measurements with respect to the received signals. The measurement section 305 can be constituted by a measurer, a measurement circuit or measurement apparatus that can be described based on general understanding of the technical field to which the present disclosure pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), SNR (Signal to Noise Ratio), etc.), the signal strength (for example, RSSI (Received Signal Strength Indicator)), propagation path information (for example, CSI), and so on. The measurement results may be output to the control section 301.

<User Equipment>

Figure 14:
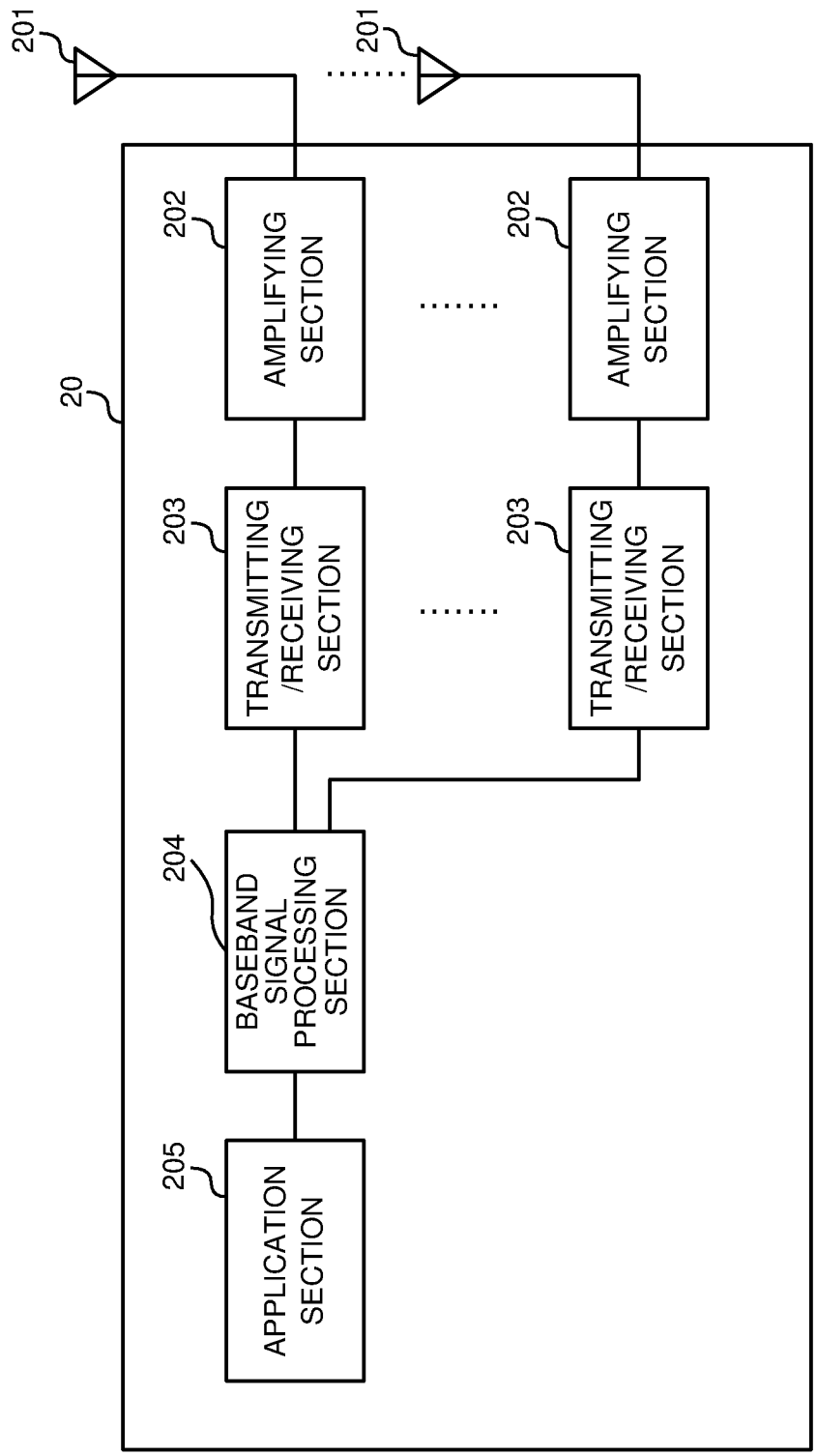
FIG. 14 is a diagram showing an example of an overall structure of user equipment according to the present embodiment.

FIG. 14 is a diagram showing an example of an overall configuration of user equipment according to the present embodiment. The user equipment 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving section 203 receives the downlink signal amplified in the amplifying section 202. The transmitting/receiving section 203 performs frequency conversion for the received signal into baseband signal, and outputs the baseband signal to the baseband signal processing section 204. The transmitting/receiving section 203 can be constituted by a transmitter/receiver, a transmitting/receiving circuit or transmitting/receiving apparatus that can be described based on general understanding of the technical field to which the present disclosure pertains. Note that the transmitting/receiving section 203 may be structured as a transmitting/receiving section in one entity, or may be constituted by a transmitting section and a receiving section.

The baseband signal processing section 204 performs receiving processing for the baseband signal that is input, including FFT processing, error correction decoding, retransmission control receiving processing and so on. Downlink user data is forwarded to the application section 205. The application section 205 performs processing related to higher layers above the physical layer and the MAC layer and so on. Also, in the downlink data, the broadcast information may be also forwarded to the application section 205.

Meanwhile, uplink user data is input from the application section 205 to the baseband signal processing section 204. The baseband signal processing section 204 performs retransmission control transmission processing (for example, HARQ transmission processing), channel coding, precoding, discrete Fourier transform (DFT) processing, IFFT processing and so on, and the result is forwarded to the transmitting/receiving section 203.

Baseband signals that are output from the baseband signal processing section 204 are converted into a radio frequency band in the transmitting/receiving sections 203 and transmitted. The radio frequency signals having been subjected to frequency conversion in the transmitting/receiving sections 203 are amplified in the amplifying sections 202, and transmitted from the transmitting/receiving antennas 201.

Note that the transmitting/receiving section 203 may further include an analog beamforming section that performs analog beamforming. The analog beamforming section can be constituted by an analog beamforming circuit (for example, a phase shifter, a phase shift circuit) or an analog beamforming apparatus (for example, a phase shifter) described based on common understanding of the technical field to which the present invention pertains. Also, the transmitting/receiving antenna 201 can be constituted by an array antenna, for example. Also, the transmitting/receiving section 203 is configured such that that single BF and multi BF can be used.

The transmitting/receiving section 203 may transmit a signal using a transmission beam and may receive a signal using a reception beam. The transmitting/receiving section 203 may transmit and/or receive a signal using a given beam determined by the control section 401.

Further, the transmitting/receiving section 203 receives a downlink (DL) signal (including at least one of the DL data signal (downlink shared channel), the DL control signal (downlink control channel), and the DL reference signal) from the radio base station 10, and transmits an uplink (UL) signal (including at least one of the UL data signal, the UL control signal, and the UL reference signal) to the radio base station 10.

Further, the transmitting/receiving section 203 may receive information regarding the number or proportion of at least one of a beam, a link and a reference signal used to specify partial beam failure detection for one or more transmission/reception points. Further, the transmitting/receiving section 203 may receive information regarding the number of reference signals (base reference signals) for beam failure detection to the UE by higher layer signaling in addition to the number or proportion of reference signals (criterion reference signals) for partial beam failure detection. Further, the transmitting/receiving section 203 transmits a recovery request transmitted from the UE when partial beam failure detection occurs.

Figure 15:
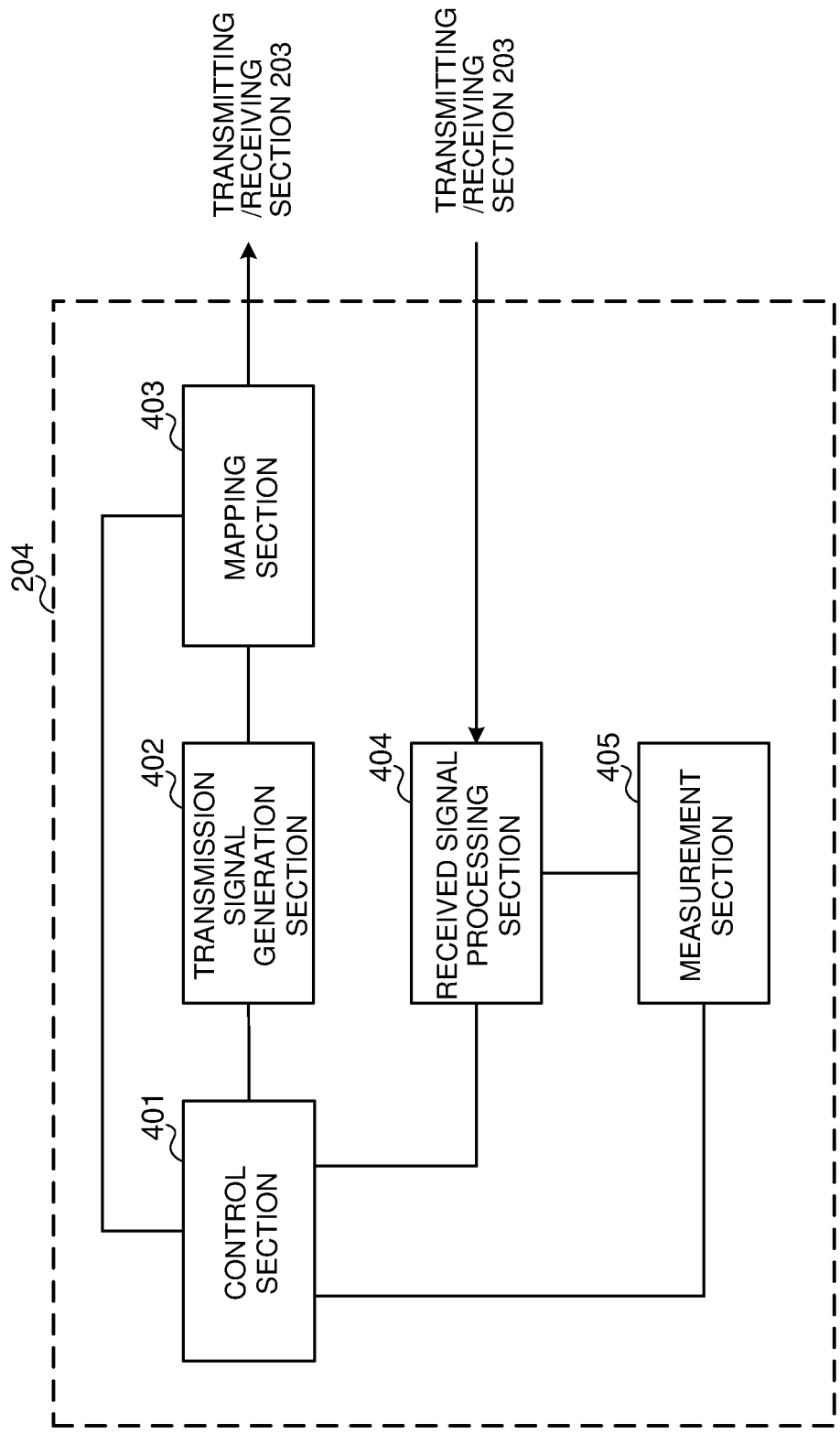
FIG. 15 is a diagram showing an example of a functional structure of user equipment according to the present embodiment.

FIG. 15 is a diagram showing an example of a functional configuration of the user equipment according to the present embodiment. Note that, although this example will primarily show functional blocks that pertain to characteristic parts of the present embodiment, it may be assumed that the user equipment 20 have other functional blocks that are necessary for radio communication as well.

The baseband signal processing section 204 provided in the user equipment 20 at least has a control section 401, a transmission signal generation section 402, a mapping section 403, a received signal processing section 404 and a measurement section 405. Note that these configurations may be included in the user equipment 20, and some or all of the configurations need not be included in the baseband signal processing section 204.

The control section 401 controls the whole of the user equipment 20. The control section 401 can be constituted by a controller, a control circuit or control apparatus that can be described based on general understanding of the technical field to which the present disclosure pertains.

The control section 401, for example, controls the generation of signals in the transmission signal generation section 402, the allocation of signals in the mapping section 403, and so on. Furthermore, the control section 401 controls the signal receiving processing in the received signal processing section 404, the measurements of signals in the measurement section 405 and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 performs partial beam failure detection in one or more transmission/reception points on the basis of the information (information regarding partial beam failure detection) regarding the number or proportion of at least one of a beam, a link and a reference signal used to specify partial beam failure detection reported by the base station.

For example, the control section 401 may independently determine the number or proportion of at least one of beams, links, and reference signals used to specify partial beam failure detection at each transmission/reception point on the basis of the information regarding partial beam failure detection.

Further, the control section 401 may determine the number or proportion of at least one of beams, links, and reference signals used to specify partial beam failure detection at a plurality of transmission/reception points on the basis of the information regarding the partial beam failure detection.

Further, the control section 401 may control the partial beam failure detection to be performed only for a preliminarily configured specific transmission/reception point.

Further, the control section 401 may perform control to transmit a recovery request to at least one of the transmission/reception point where partial beam failure has been detected, other transmission/reception points, and a fixed transmission/reception point, in response to the partial beam failure detection by using an uplink control channel or uplink shared channel.

Further, the control section 401 may perform control to transmit a recovery request by using a random access channel when there is no available beam (e.g., uplink control channel or uplink shared channel) for communication in at least one of the transmission/reception point where partial beam failure has been detected, other transmission/reception points, and a fixed transmission/reception point.

The transmission signal generation section 402 generates uplink signals (uplink control signals, uplink data signals, uplink reference signals, etc.) based on instructions from the control section 401, and outputs these signals to the mapping section 403. The transmission signal generation section 402 can be constituted by a signal generator, a signal generating circuit or signal generation apparatus that can be described based on general understanding of the technical field to which the present disclosure pertains.

For example, the transmission signal generation section 402 generates uplink control signals such as delivery acknowledgement information, channel state information (CSI) and so on, based on instructions from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on instructions from the control section 401, and output the result to the transmitting/receiving section 203. The mapping section 403 can be constituted by a mapper, a mapping circuit or mapping apparatus that can be described based on general understanding of the technical field to which the present disclosure pertains.

The received signal processing section 404 performs receiving processing (for example, demapping, demodulation, decoding and so on) of received signals that are input from the transmitting/receiving sections 203. Here, the received signals include, for example, downlink signals (downlink control signals, downlink data signals, downlink reference signals, and so on) that are transmitted from the radio base station 10. The received signal processing section 404 can be constituted by a signal processor, a signal processing circuit or signal processing apparatus that can be described based on general understanding of the technical field to which the present disclosure pertains. Also, the received signal processing section 404 can constitute the receiving section according to the present disclosure.

The received signal processing section 404 outputs the decoded information that is acquired through the receiving processing to the control section 401. The received signal processing section 404 outputs, for example, broadcast information, system information, RRC signaling, DCI, and so on, to the control section 401. Also, the received signal processing section 404 outputs the received signals and/or the signals after the receiving processing to the measurement section 405.

The measurement section 405 conducts measurements with respect to the received signals. The measurement section 405 can be constituted by a measurer, a measurement circuit or measurement apparatus that can be described based on general understanding of the technical field to which the present disclosure pertains.

For example, the measurement section 405 may perform RRM measurements, CSI measurements and so on based on the received signals. The measurement section 405 may measure the received power (for example, RSRP), the received quality (for example, RSRQ, SINR, SNR, etc.), the signal strength (for example, RSSI), propagation path information (for example, CSI), and so on. The measurement results may be output to the control section 401.

<Hardware Structure>

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be achieved by a single apparatus physically or logically aggregated, or may be achieved by directly or indirectly connecting two or more physically or logically separate apparatuses (using wires, radio, or the like, for example) and using these plural apparatuses. The functional block may be realized by combining the one device or the plurality of devices with software.

Here, the functions include, but are not limited to, judging, determination, decision, calculation, computation, processing, derivation, investigation, search, confirmation, reception, transmission, output, access, solution, selection, choosing, establishment, comparison, assumption, expectation, and deeming, broadcasting, notifying, communicating, forwarding, configuring, reconfiguring, allocating, mapping, and assigning. For example, a functional block (configuration unit) that causes transmission to function may be referred to as a transmitting section, a transmitter, or the like. In any case, as described above, the implementation method is not particularly limited.

Figure 16:
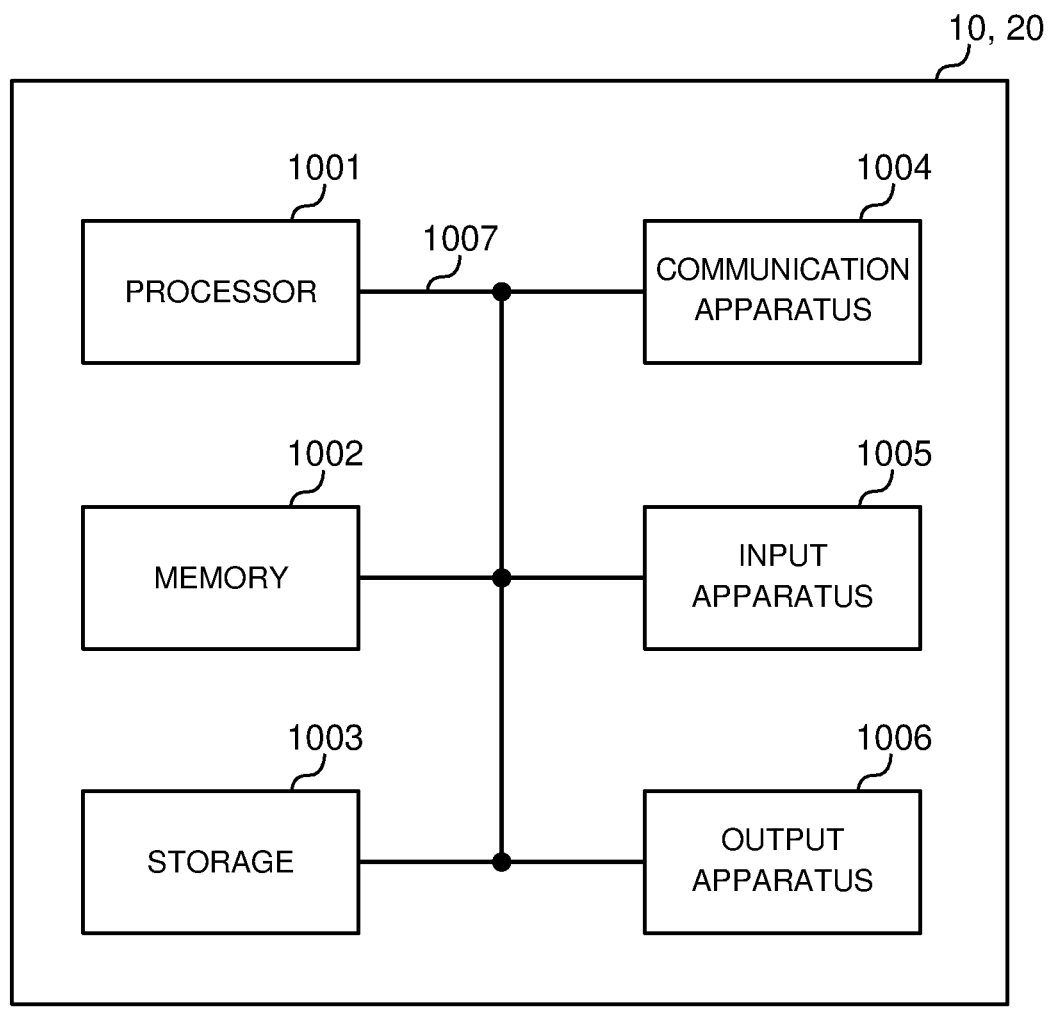
FIG. 16 is a diagram showing an example of a hardware structure of a radio base station and user equipment according to the present embodiment.

For example, the base station, the user equipment, and so on according to one embodiment of the present disclosure may function as a computer that executes the processing of the radio communication method of the present disclosure. FIG. 16 is a diagram showing an example of a hardware structure of the base station and the user equipment according to one embodiment. Physically, the above-described base station 10 and user equipment 20 may be formed as a computer apparatus that includes a processor 1001, a memory 1002, a storage 1003, a communication apparatus 1004, an input apparatus 1005, an output apparatus 1006 and a bus 1007.

Note that, in the following description, the word "apparatus" may be replaced by "circuit", "device", "unit" and so on. The hardware structure of the base station 10 and the user equipment 20 may be designed to include one or more of each apparatus shown in the drawings, or may be designed not to include some apparatuses.

For example, although only one processor 1001 is shown, a plurality of processors may be provided. Furthermore, processing may be implemented with one processor, or processing may be implemented in sequence, or in different manners, on two or more processors. Note that the processor 1001 may be implemented with one or more chips.

Each function of the base station 10 and the user equipment 20 is implemented by reading given software (program) on hardware such as the processor 1001 and the memory 1002, and by controlling the operation in the processor 1001, the communication in the communication apparatus 1004, and at least one of the reading and writing of data in the memory 1002 and the storage 1003.

The processor 1001 may control the whole computer by, for example, running an operating system. The processor 1001 may be configured with a central processing unit (CPU), which includes interfaces with peripheral equipment, a control apparatus, an operation apparatus, a register and so on. For example, the above-described baseband signal processing section 104 (204), call processing section 105 and so on may be implemented by the processor 1001.

Furthermore, the processor 1001 reads programs (program codes), software modules, or data, from at least one of the storage 1003 and the communication apparatus 1004, into the memory 1002, and executes various processing according to these. As for the programs, programs to allow computers to execute at least part of the operations described in the above-described embodiments may be used. For example, the control section 401 of the user equipment 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register", a "cache", a "main memory (main storage device)" and so on. The memory 1002 can store a program (program code), a software module, and the like, which are executable for implementing the radio communication method according to one embodiment of the present disclosure.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus".

The communication apparatus 1004 is hardware (transmitting/receiving device) for performing inter-computer communication via at least one of a wired network and a wireless network, and for example, is referred to as "network device", "network controller", "network card", "communication module", and the like. The communication apparatus 1004 may be configured to include a high frequency switch, a duplexer, a filter, a frequency synthesizer and so on in order to implement, for example, at least one of frequency division duplex (FDD) and time division duplex (TDD). For example, the above-described transmitting/receiving antennas 101 (201), amplifying sections 102 (202), transmitting/receiving sections 103 (203), communication path interface 106 and so on may be implemented by the communication apparatus 1004. The transmitting/receiving section 103 may be implemented by physically or logically separating a transmitting section 103*a* and a receiving section 103*b*.

The input apparatus 1005 is an input device for receiving input from the outside (for example, a keyboard, a mouse, a microphone, a switch, a button, a sensor and so on). The output apparatus 1006 is an output device for allowing output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the base station 10 and the user equipment 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced with other terms that convey the same or similar meanings. For example, at least one of "channels" and "symbols" may be replaced by "signals" (or "signaling"). The signal may also be a message. A reference signal may be abbreviated as an RS, and may be referred to as a pilot, a pilot signal, and so on, depending on which standard applies. Furthermore, a "component carrier (CC)" may be referred to as a "cell", a "frequency carrier", a "carrier frequency" and so on.

A radio frame may be comprised of one or more periods (frames) in the time domain. Each of one or a plurality of periods (frames) constituting a radio frame may be referred to as a subframe. Furthermore, a subframe may be comprised of one or a plurality of slots in the time domain. A subframe may be a fixed time duration (for example, 1 ms) that is not dependent on numerology.

Here, the numerology may be a communication parameter used for at least one of transmission and reception of a certain signal or channel. For example, the numerology may indicate at least one of SubCarrier Spacing (SCS), a bandwidth, a symbol length, a cyclic prefix length, a transmission time interval (TTI), the number of symbols per TTI, a radio frame structure, specific filtering processing to be performed by a transceiver in the frequency domain, specific windowing processing to be performed by a transceiver in the time domain and so on.

A slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology.

A slot may include a plurality of minislots. Each minislot may be comprised of one or more symbols in the time domain. Also, a minislot may be referred to as a "subslot". Each minislot may be comprised of fewer symbols than a slot. A PDSCH (or PUSCH) transmitted in a time unit larger than a minislot may be referred to as PDSCH (PUSCH) mapping type A. A PDSCH (or PUSCH) transmitted using a minislot may be referred to as "PDSCH (PUSCH) mapping type B".

A radio frame, a subframe, a slot, a minislot and a symbol all represent the time unit in signal communication. A radio frame, a subframe, a slot, a minislot and a symbol may be each called by other applicable names. Note that time units such as a frame, a subframe, a slot, a minislot, and a symbol in the present disclosure may be replaced with each other.

For example, one subframe may be referred to as a "transmission time interval (TTI)", or a plurality of consecutive subframes may be referred to as a "TTI", or one slot or one mini-slot may be referred to as a "TTI". That is, at least one of a subframe and a TTI may be a subframe (1 ms) in the existing LTE, may be a shorter period than 1 ms (for example, one to thirteen symbols), or may be a longer period of time than 1 ms. Note that the unit to represent the TTI may be referred to as a "slot", a "mini slot" and so on, instead of a "subframe".

Here, a TTI refers to the minimum time unit of scheduling in radio communication, for example. For example, in LTE systems, the base station schedules the radio resources (such as the frequency bandwidth and transmission power that can be used in each user equipment) to allocate to each user equipment in TTI units. Note that the definition of TTIs is not limited to this.

The TTI may be the transmission time unit of channel-encoded data packets (transport blocks), code blocks, codewords and so on, or may be the unit of processing in scheduling, link adaptation and so on. Note that when TTI is given, a time interval (for example, the number of symbols) in which the transport blocks, the code blocks, the codewords, and the like are actually mapped may be shorter than TTI.

Note that, when one slot or one minislot is referred to as a "TTI", one or more TTIs (that is, one or multiple slots or one or more minislots) may be the minimum time unit of scheduling. Also, the number of slots (the number of minislots) to constitute this minimum time unit of scheduling may be controlled.

TTI having a time length of 1 ms may be called usual TTI (TTI in LTE Rel. 8 to 12), normal TTI, long TTI, a usual subframe, a normal subframe, a long subframe, a slot, or the like. A TTI that is shorter than a usual TTI may be referred to as "shortened TTI", "short TTI", "partial TTI" (or "fractional TTI"), "shortened subframe", "short subframe", "minislot", "sub-slot", "slot", or the like.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. The number of subcarriers included in the RB may be the same regardless of the numerology, and may be 12, for example. The number of subcarriers included in the RB may be determined based on numerology.

Also, an RB may include one or more symbols in the time domain, and may be one slot, one minislot, one subframe or one TTI in length. One TTI, one subframe, and the like each may be comprised of one or more resource blocks.

Note that one or more RBs may be referred to as a "physical resource block (PRB (Physical RB))", a "subcarrier group (SCG)", a "resource element group (REG)", a "PRB pair", an "RB pair" and so on.

Furthermore, a resource block may be comprised of one or more resource elements (REs). For example, one RE may be a radio resource field of one subcarrier and one symbol.

The bandwidth part (BWP) (which may be called partial bandwidth etc.) may represent a subset of consecutive common RB (common resource blocks) for a certain numerology in a certain carrier. Here, the common RB may be specified by the index of the RB based on a common reference point of the carrier. The PRB may be defined in a BWP and numbered within that BWP.

The BWP may include a BWP for UL (UL BWP) and a BWP for DL (DL BWP). For the UE, one or more BWPs may be configured within one carrier.

At least one of the configured BWPs may be active, and the UE may not assume to transmit or receive a given signal/channel outside the active BWP. Note that "cell", "carrier", and the like in the present disclosure may be read as "BWP".

Note that the structures of radio frames, subframes, slots, minislots, symbols and so on described above are merely examples. For example, configurations pertaining to the number of subframes included in a radio frame, the number of slots included in a subframe or a radio frame, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in the present disclosure may be represented in absolute values or in relative values with respect to given values, or may be represented using other applicable information. For example, a radio resource may be specified by a given index.

The names used for parameters and so on in the present disclosure are in no respect limiting. In addition, an equation and so on using these parameters may differ from those explicitly disclosed in the present disclosure. Since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in the present disclosure may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Further, information, signals and the like can be output in at least one of a direction from higher layers to lower layers and a direction from lower layers to higher layers. Information, signals and so on may be input and output via a plurality of network nodes.

The information, signals and so on that are input and/or output may be stored in a specific location (for example, in a memory), or may be managed in a control table. The information, signals, and so on that are input and/or output can be overwritten, updated, or appended. The information, signals, and so on that are output may be deleted. The information, signals and so on that are input may be transmitted to other pieces of apparatus.

The reporting of information is by no means limited to the aspects/embodiments described in the present disclosure, and may be performed using other methods. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)", "L1 control information (L1 control signal)" and so on. Also, RRC signaling may be referred to as RRC messages, and can be, for example, an RRC connection setup message, RRC connection reconfiguration message, and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a given value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using at least one of wired technologies (coaxial cables, optical fiber cables, twisted-pair cables, digital subscriber lines (DSLs), and the like) and wireless technologies (infrared radiation, microwaves, and the like), at least one of these wired technologies and wireless technologies are also included in the definition of communication media.

The terms "system" and "network" as used in the present disclosure are used interchangeably.

In the present disclosure, the terms such as "precoding", "precoder", "weight (precoding weight)", "quasi-co-location (QCL)", "transmission power", "phase rotation", "antenna port", "antenna port group", "layer", "number of layers", "rank", "beam", "beam width", "beam angle", "antenna", "antenna element", and "panel" may be used interchangeably.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier" may be used interchangeably. The base station may be called a term such as a macro cell, a small cell, a femto cell, a pico cell, and the like.

A base station can accommodate one or more (for example, three) cells. When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to all or part of the coverage area of at least one of a base station and a base station subsystem that provides communication services within this coverage.

In the present disclosure, the terms "mobile station (MS)", "user equipment", "user equipment (UE)", "terminal", etc. may be used interchangeably.

A mobile station may be referred to as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of a base station and a mobile station may be referred to as transmitting apparatus, receiving apparatus, communication apparatus and so on. Note that at least one of the base station and the mobile station may be a device mounted on a mobile unit, a mobile unit itself, or the like. The mobile unit may be a vehicle (such as a car, an airplane, for example), an unmanned mobile unit (such as a drone, an autonomous vehicle, for example), or a robot (manned or unmanned). Note that at least one of the base station and the mobile station also includes a device that does not necessarily move during a communication operation. For example, at least one of the base station and the mobile station may be an IoT (Internet of Things) device such as a sensor.

Furthermore, the base stations in the present disclosure may be read as the user equipment. For example, each aspect/embodiment of the present disclosure may be applied to a structure in which communication between the base station and the user equipment is replaced by communication among a plurality of user equipment (which may be referred to as, for example, D2D (Device-to-Device), V2X (Vehicle-to-Everything) and so on). In this case, the user equipment 20 may have the functions of the base station 10 described above. In addition, the wording such as "up" and "down" may be replaced with the wording corresponding to the terminal-to-terminal communication (for example, "side"). For example, an uplink channel and a downlink channel may be interpreted as a side channel.

Likewise, the user equipment in the present disclosure may be interpreted as the base station. In this case, the base station 10 may have the functions of the user equipment 20 described above.

Certain actions that have been described in the present disclosure to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments shown in the present disclosure may be used individually or in combinations, which may be switched depending on the mode of implementation. The order of processing, sequences, flowcharts and so on that have been used to describe the aspects/embodiments in the present disclosure may be re-ordered as long as inconsistencies do not arise. For example, although various methods have been shown in the present disclosure with various components of steps using exemplary orders, the specific orders that are shown herein are by no means limiting.

The aspects/embodiments shown in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next generation systems that are enhanced based on these. Further, a plurality of systems may be combined and applied (for example, a combination of LTE or LTE-A and 5G).

The phrase "based on" as used in the present disclosure does not mean "based only on", unless otherwise specified. In other words, the phrase "based on" means both "based only on" and "based at least on".

Reference to elements with designations such as "first", "second" and so on as used in the present disclosure does not generally limit the number/quantity or order of these elements. These designations are used in the present disclosure only for convenience, as a method for distinguishing between two or more elements. In this way, reference to the first and second elements does not imply that only two elements may be employed, or that the first element must precede the second element in some way.

The terms "judge" and "determine" as used in the present disclosure may encompass a wide variety of actions. For example, "determining" may be regarded as judging, calculating, computing, processing, deriving, investigating, looking up, search, inquiry (for example, looking up in a table, database, or another data structure), ascertaining, and the like.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on.

In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

In addition, to "judge" and "determine" as used herein may be interpreted to mean "assuming", "expecting", "considering" and so on.

As used in the present disclosure, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced by "access".

As used in the present disclosure, when two elements are connected, these elements may be considered "connected" or "coupled" to each other by using one or more electrical wires, cables, printed electrical connections, and the like, and, as some non-limiting and non-inclusive examples, by using electromagnetic energy, such as electromagnetic energy having wavelengths in the radio frequency, microwave, and optical (both visible and invisible) domains.

In the present disclosure, the phrase "A and B are different" may mean "A and B are different from each other". Note that the term may mean that "A and B are different from C". The terms such as "leave" "coupled" and the like may be interpreted as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive disjunction.

In the present disclosure, where translations add articles, such as a, an, and the in English, the present disclosure may include that the noun that follows these articles is in the plural.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of the claims. Consequently, the description in the present disclosure is provided only for the purpose of explaining examples, and should by no means be construed to limit the invention according to the present disclosure in any way.

The invention claimed is:

1. A terminal comprising:
   a receiver configured to receive information regarding a number or proportion of at least one of a beam, a link, and a reference signal used to specify partial beam failure detection with respect to one or more transmission/reception points; and
   a processor configured to perform partial beam failure detection at one or a plurality of transmission/reception points based on the information, and to perform the partial beam failure detection only with respect to a specific transmission/reception point configured in advance.

2. The terminal according to claim 1, wherein the processor independently determines the number or proportion of at least one of the beam, the link, and the reference signal used to specify the partial beam failure detection at each transmission/reception point based on the information.

3. The terminal according to claim 2, wherein the processor performs control to transmit a recovery request to at least one of a transmission/reception point where the partial beam failure has been detected, another transmission/reception point, and a fixed transmission/reception point in response to the partial beam failure detection by using an uplink control channel or uplink shared channel.

4. The terminal according to claim 2, wherein the processor performs control to transmit a recovery request by using a random access channel when an uplink control channel or uplink shared channel available for communication is absent in at least one of a transmission/reception point where the partial beam failure has been detected, another transmission/reception point, and a fixed transmission/reception point.

5. The terminal according to claim 1, wherein the processor determines the number or proportion of at least one of the beam, the link, and the reference signal used to specify the partial beam failure detection at the plurality of transmission/reception points based on the information.

6. The terminal according to claim 5, wherein the processor performs control to transmit a recovery request to at least one of a transmission/reception point where the partial beam failure has been detected, another transmission/reception point, and a fixed transmission/reception point in response to the partial beam failure detection by using an uplink control channel or uplink shared channel.

7. The terminal according to claim 5, wherein the processor performs control to transmit a recovery request by using a random access channel when an uplink control channel or uplink shared channel available for communication is absent in at least one of a transmission/reception point where the partial beam failure has been detected, another transmission/reception point, and a fixed transmission/reception point.

8. The terminal according to claim 1, wherein the processor performs control to transmit a recovery request to at least one of a transmission/reception point where the partial beam failure has been detected, another transmission/reception point, and a fixed transmission/reception point in response to the partial beam failure detection by using an uplink control channel or uplink shared channel.

9. The terminal according to claim 8, wherein the processor performs control to transmit a recovery request by using a random access channel when an uplink control channel or uplink shared channel available for communication is absent in at least one of a transmission/reception point where the partial beam failure has been detected, another transmission/reception point, and a fixed transmission/reception point.

10. The terminal according to claim 1, wherein the processor performs control to transmit a recovery request by using a random access channel when an uplink control channel or uplink shared channel available for communication is absent in at least one of a transmission/reception point where the partial beam failure has been detected, another transmission/reception point, and a fixed transmission/reception point.

* * * * *